(12) United States Patent
Liu et al.

(10) Patent No.: US 7,810,490 B2
(45) Date of Patent: Oct. 12, 2010

(54) SOLAR AIR CONDITIONING DEVICE

(75) Inventors: Tay-Jian Liu, Taipei Hsien (TW);
Xin-Jian Xiao, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 392 days.

(21) Appl. No.: 11/959,431

(22) Filed: Dec. 18, 2007

(65) Prior Publication Data
US 2008/0264410 A1 Oct. 30, 2008

(30) Foreign Application Priority Data
Apr. 25, 2007 (CN) .......................... 2007 1 0074207

(51) Int. Cl.
*E04D 13/18* (2006.01)
*F24J 2/04* (2006.01)
(52) U.S. Cl. .................. 126/629; 126/635; 126/684; 126/692; 126/693; 126/704; 62/235.1
(58) Field of Classification Search ............... 126/628, 126/629, 651 X, 648 X; 62/235.1
See application file for complete search history.

(56) References Cited
U.S. PATENT DOCUMENTS

| 4,392,483 | A | * | 7/1983 | Koenig | .................. 126/650 |
|---|---|---|---|---|---|
| 4,426,999 | A | * | 1/1984 | Evans et al. | .................. 126/669 |
| 4,607,616 | A | * | 8/1986 | Lehmann | .................. 126/669 |
| 5,145,287 | A | | 9/1992 | Hooper et al. | |
| 5,657,745 | A | * | 8/1997 | Damminger | .................. 126/633 |
| 6,880,553 | B2 | * | 4/2005 | Liu et al. | .................. 126/628 |
| 7,484,507 | B2 | * | 2/2009 | Nikiforov et al. | ........... 126/628 |
| 2005/0241633 | A1 | | 11/2005 | Nikiforov et al. | |

FOREIGN PATENT DOCUMENTS

TW 579416 3/2004

* cited by examiner

*Primary Examiner*—Steven B McAllister
*Assistant Examiner*—Nikhil Mashruwala
(74) *Attorney, Agent, or Firm*—Jeffrey T. Knapp

(57) ABSTRACT

A solar air conditioning device (100) includes a solar collector assembly (30), an inlet assembly (10) at an entrance of the solar collector assembly, and an outlet assembly (50) at an exit of the solar collector assembly. The solar collector assembly includes a heat-absorbing set (31) and a transparent panel (38) being assembled to a top of the heat-absorbing set. The heat-absorbing set comprises a plurality of heat-absorbing units (32) engaged with each other. Each of the heat-absorbing units includes two adjacent supporting members (33) and a heat-absorbing plate (35) sandwiched between and buckled with the two supporting members. The heat-absorbing set defines an air channel (314) with the transparent panel and a heat-absorbing channel (315) below the air channel. The inlet and outlet assemblies are in fluidic communication with the heat-absorbing channel.

16 Claims, 29 Drawing Sheets

SOLAR AIR CONDITIONING DEVICE

CROSS-REFERENCES TO RELATED APPLICATION

This application is related to U.S. patent application Ser. No. 11/776,906 filed on Jul. 26, 2007 and entitled "SOLAR AIR CONDITIONING DEVICE"; the co-pending U.S. patent application is assigned to the same assignee as the instant application. The disclosure of the above-identified application is incorporated herein by reference.

BACKGROUND OF THE INVENTION

1. Field of the Invention

The present invention relates to air conditioning devices, and particularly, to an air conditioning device using solar energy to heat air.

2. Description of Related Art

With increasing $CO_2$ emissions, the risk of global climate becomes abnormal and ecological destruction may increase. As a result, industrialized countries have again become aware of the urgency to reduce their dependence on fossil fuels after the energy crisis in the 70's. Therefore, it has become important to develop new environmental friendly energy resources, and to replace devices using non-renewable energy resources, such as air-conditioners, with devices using renewable energy. The conventional air conditioning devices not only need more energy, but also require refrigerant which can be harmful to the environment. Consequently, these countries have given positive commitments to use solar energy more effectively. Though people still have reservations about whether solar energy will be able to replace other energy resources in the near future, one thing that is almost certain is that solar energy will be playing a very important role in a number of fields, especially air ventilation and heating in structures such as buildings and vehicles.

As far as an air conditioning device using solar energy for heating and air ventilation is concerned, solar collectors are a key part in such a device, and it has to be mounted at an outside location where sufficient sunlight can be collected, such as on a roof or wall. In the past, a lot of effort has been made to develop solar collectors with different functions and styles. Many of them have been disclosed in patent literature. The most typical example is fixing a glass panel or transparent panel onto a fixed outer frame of a heat-insulated chamber and passing fluid through black heat-absorbing plates or pipes installed inside the chamber, so as to absorb solar energy. Examples include the solar hot water supply system disclosed in U.S. Pat. No. 4,418,685, the air ventilation facility disclosed in WO 9,625,632, the roof-style air ventilation facility disclosed in US No. 2002/0,032,000A1, and the wall-style air preheater disclosed in U.S. Pat. No. 4,934,338. However, the solar collectors used presently still have some drawbacks. Therefore, there is much room for improvements in applying and promoting the usage of solar energy to save energy and facilitate air conditioning. The aforementioned drawbacks include:

(1) The related solar collector is too heavy. Its long-term use may cause an overly heavy load on the bearing structure.
(2) Solar-thermo conversion efficiency may be limited.
(3) The structure of the related solar collector is complicated, which makes its installation and maintenance difficult. And thus prolongs the return period.
(4) The related solar heating device has poor compatibility and flexibility to match different bearing structures. Very often, it has to be custom-made.
(5) The contour of the solar collector is obtrusive and often impairs the aesthete and harmony of the overall appearance of the bearing structure.
(6) The packaging needed for the collector takes up much space and increases the cost of storage, display, and marketing.
(7) The integral assembly of the whole-unit product is bulky, making it difficult to use in large-area application and increases installation cost.
(8) Glass or transparent panels are glazed onto the outer frame of a heat-insulated chamber. Different thermal expansion coefficients of materials may cause thermal stress problems.
(9) The related design is so complicated as to be difficult for an untrained user to install.
(10) Some of the related designs can only be applicable to the structures which are under construction and designed to allow its installation. For most existing structures, the designs are unsuitable.
(11) When air passes over a glazed panel, heat is dissipated unless double-glazing is used, but it is expensive and troublesome.
(12) Hot water supply systems or liquid systems operated by solar heating experience problems due to freezing and leakage of the working liquid.

Related solar air conditioning devices include that disclosed in U.S. Pat. No. 6,880,553. Heat-absorbing units of the solar air conditioning device of U.S. Pat. No. 6,880,553 are connected in a fixed way, however it is difficult to extend the area of the solar air conditioning device in a convenient way so that the solar air conditioning device can be used in different applications.

It is therefore desirable to provide a solar air conditioning device that can be flexibly extended and used in different applications.

SUMMARY OF THE INVENTION

A solar air conditioning device comprises a solar collector assembly, an inlet assembly installed at an entrance of the solar collector assembly, and an outlet assembly installed at an exit of the solar collector assembly. The solar collector assembly includes a heat-absorbing set and a transparent panel being assembled to a top of the heat-absorbing set. The heat-absorbing set comprises a plurality of heat-absorbing units. Each of the heat-absorbing units includes two adjacent supporting members and a heat-absorbing plate sandwiched between and buckled with the two supporting members.

The heat-absorbing units can be assembled together in a flexible way via the supporting members and the heat-absorbing plates. Thus, the solar air conditioning assembly can be used in many different applications.

The solar air conditioning device can heat stale air guided from exhaust pipes connecting with a room requiring cooling and expel the hot stale air out of the structure by thermal buoyancy. Cool and fresh air outside can be guided to the room requiring cooling, or air from outside can be cooled and guided into the room requiring cooling. Thus, the solar air conditioning device can be used as an air conditioning system.

According to concept of a modular design, the solar air conditioning assembly provides users with a boarder range of applications. Moreover, the solar air conditioning assembly provides users with more selection and freedom in assembly. The solar air conditioning assembly can be installed horizontally or vertically attached to walls. Furthermore, it can be installed obliquely. The solar air conditioning assembly can also provide excellent heat insulation and protection to structures.

The heat-absorbing units used in the solar air conditioning assembly can be flexibly expanded as desired to the most optimal absorption surface areas to fully absorb and collect energy. Therefore, the solar air conditioning assembly does not need a fixed outer frame insulation chamber like the one used in the related solar air conditioning assembly. The solar air conditioning assembly also needs no special consideration for the heat efficiency of each individual unit, as related models do.

The solar air conditioning assembly only need one layer of transparent panel; because most of the air goes through the lower heat-absorbing channels, the assembly has the excellent insulation effect of a double-glazed system and a very high heat-absorption efficiency.

The solar air conditioning assembly is designed according to a modular concept. Cost of the solar air conditioning assembly is greatly reduced as the heat-absorbing units are made of thin boards and plates. The solar air conditioning assembly is much simpler than the related assemblies with a one piece unit design. The assembly not only reduces cost in packaging but also requires less room for display and storage thus making marketing much easier. The solar air conditioning assembly is very easy to install and maintain, so users can install or assemble the system by themselves.

The solar air conditioning assembly is operated and powered by solar energy and therefore does not rely on an electrical power source and does not need a refrigerant. Furthermore, the solar air conditioning assembly having modular heat-absorbing units can be increased in size to fit different conditions and function requirements.

Other advantages and novel features of the present invention will become more apparent from the following detailed description of preferred embodiment when taken in conjunction with the accompanying drawings.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present device. Moreover, in the drawings, like reference numerals designate corresponding parts throughout the several views.

FIG. 3(C1) is a side view of FIG. 3;

FIGS. 3(C2)-3(C6) are side views of supporting members in accordance with other different embodiments;

DETAILED DESCRIPTION OF THE INVENTION

Figure 1:
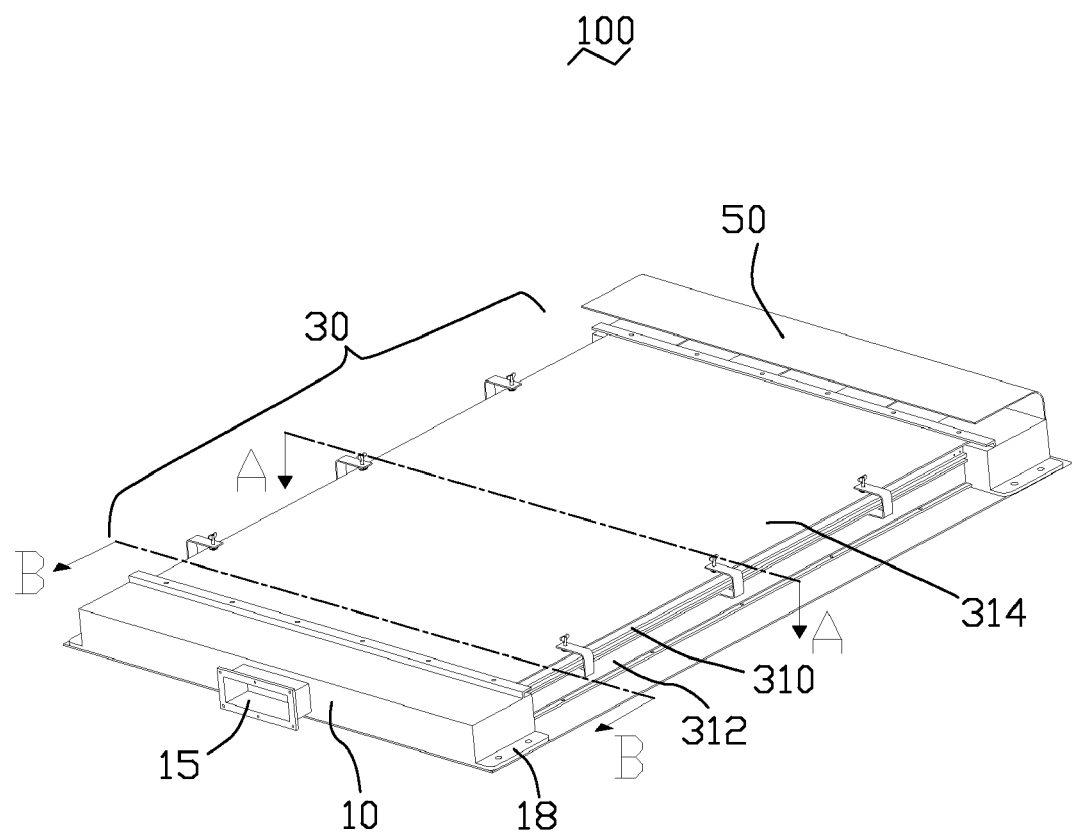
FIG. 1 is an assembled, schematic view of a solar air conditioning device in accordance with the preferred embodiment of the present invention.
Figure 2:
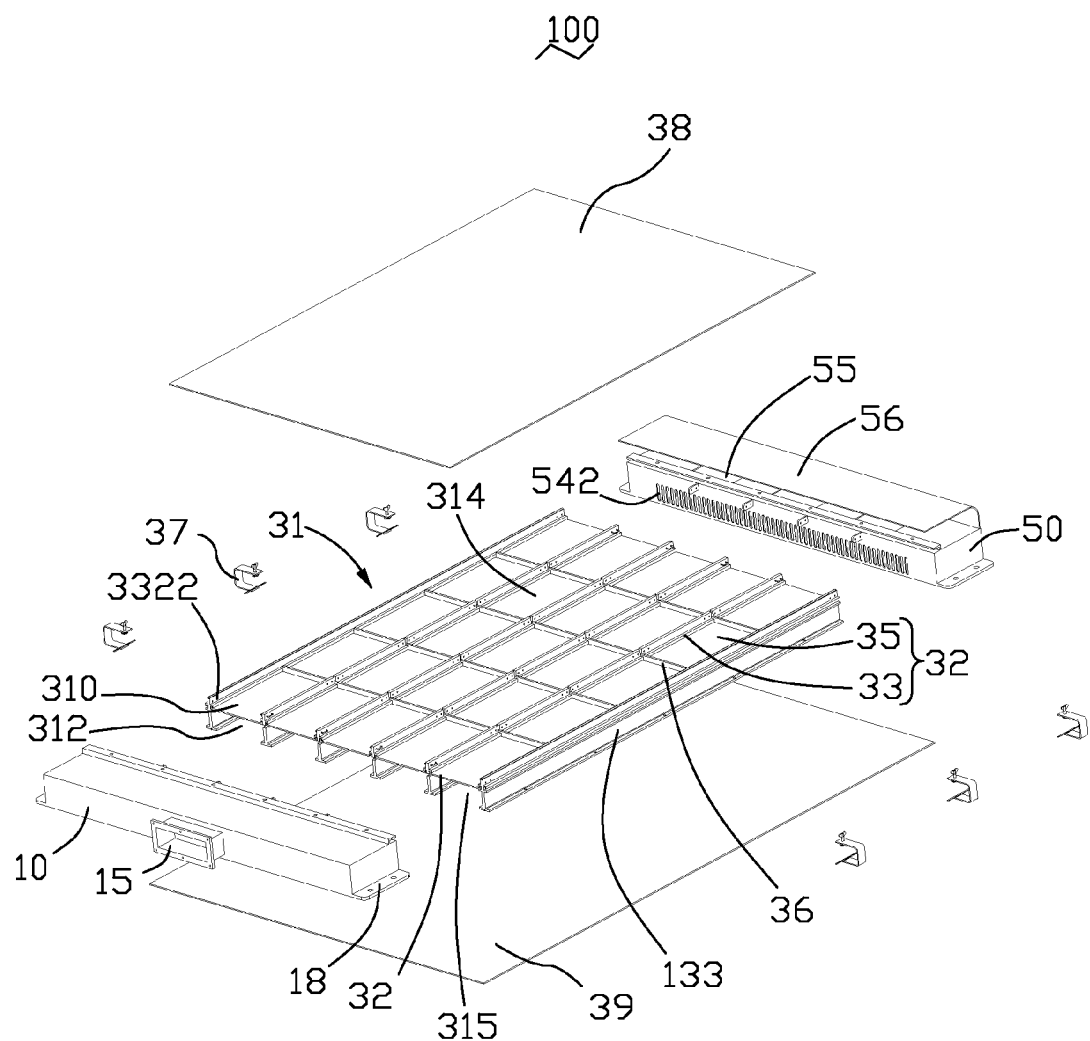
FIG. 2 is an exploded, schematic view of the solar air conditioning device in FIG. 1.

Referring to FIG. 1 and FIG. 2, a solar air conditioning device 100 in accordance with the present invention is shown. The air conditioning device 100 comprises a solar collector assembly 30, an inlet assembly 10, and an outlet assembly 50. The solar collector assembly 30 comprises a heat-absorbing set 31, a transparent panel 38 located above the heat-absorbing set 31, and a bottom plate 39 located below the heat-absorbing set 31. The heat-absorbing set 31 is used for absorbing solar energy to heat air through the heat-absorbing channels 315. The heat-absorbing set 31 comprises a plurality of modular heat-absorbing units 32 and a plurality of connecting units 36. The heat-absorbing units 32 are connected with each other via the connecting units 36 in a longitudinal direction. The heat-absorbing units 32 are made of good thermal conductivity materials with black surface. The heat-absorbing units 32 are manufactured by aluminum extrusion. Then they are subjected to surface treatment of anode oxidation and black coloring. The solar collector assembly 30 defines a plurality of upper heat-retention cavities 310 and a plurality of lower heat-absorbing cavities 312 by the heat-absorbing units 32 and the transparent panel 38. A plurality of air channel 314 is defined in the upper heat-retention cavities 310 and between the transparent panel 38 and the heat-absorbing set 31. A plurality of heat-absorbing channels 315 is defined in the lower heat-absorbing cavities 312 and between the bottom plate 39 and the heat-absorbing set 31.

Figure 3:
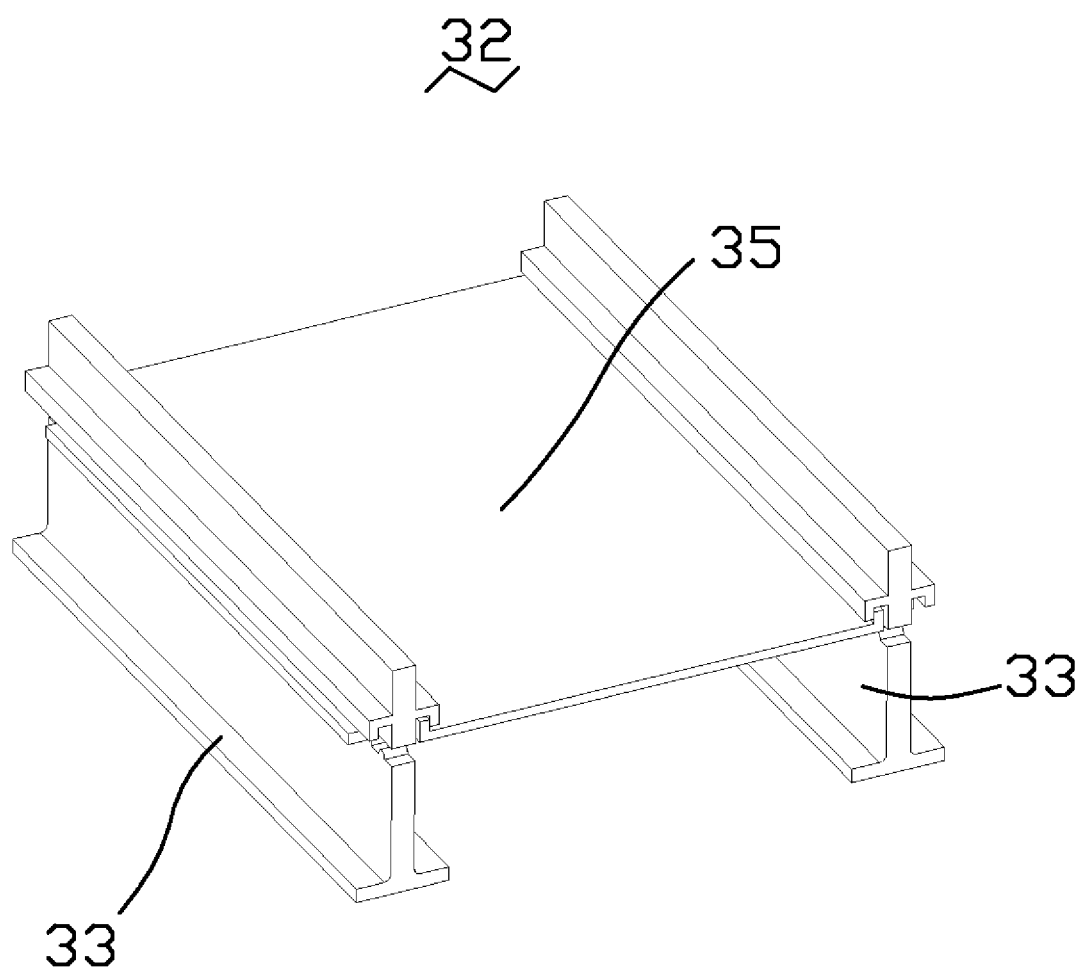
FIG. 3 is a schematic view of a heat-absorbing unit used in the air conditioning device in FIG. 1.
Figure 3A:
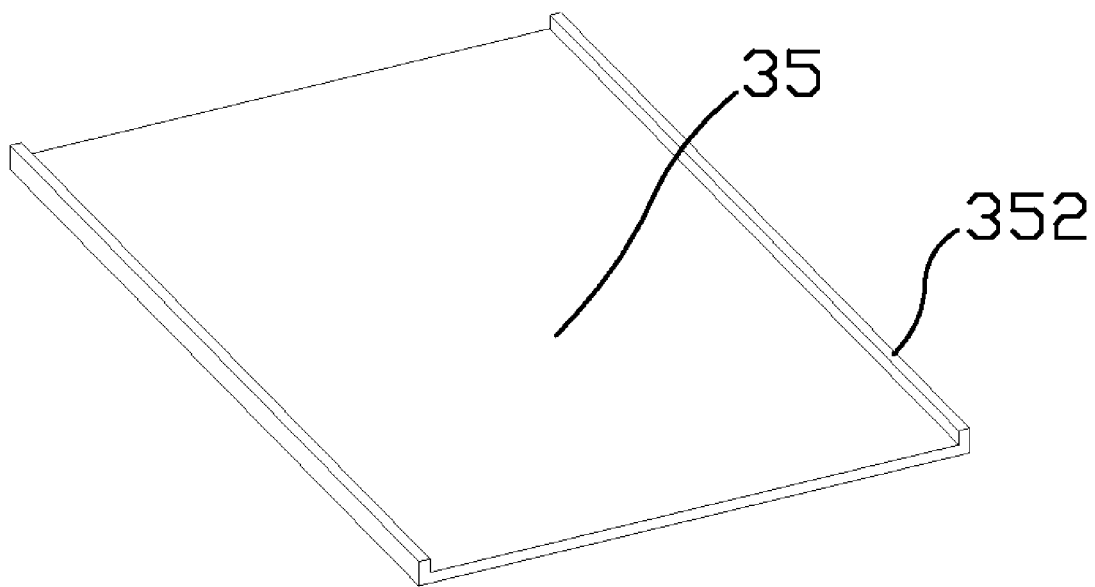
FIG. 3(A) is a schematic view of a heat-absorbing plate for engaging with the heat-absorbing unit in FIG. 3.
Figure 3B:
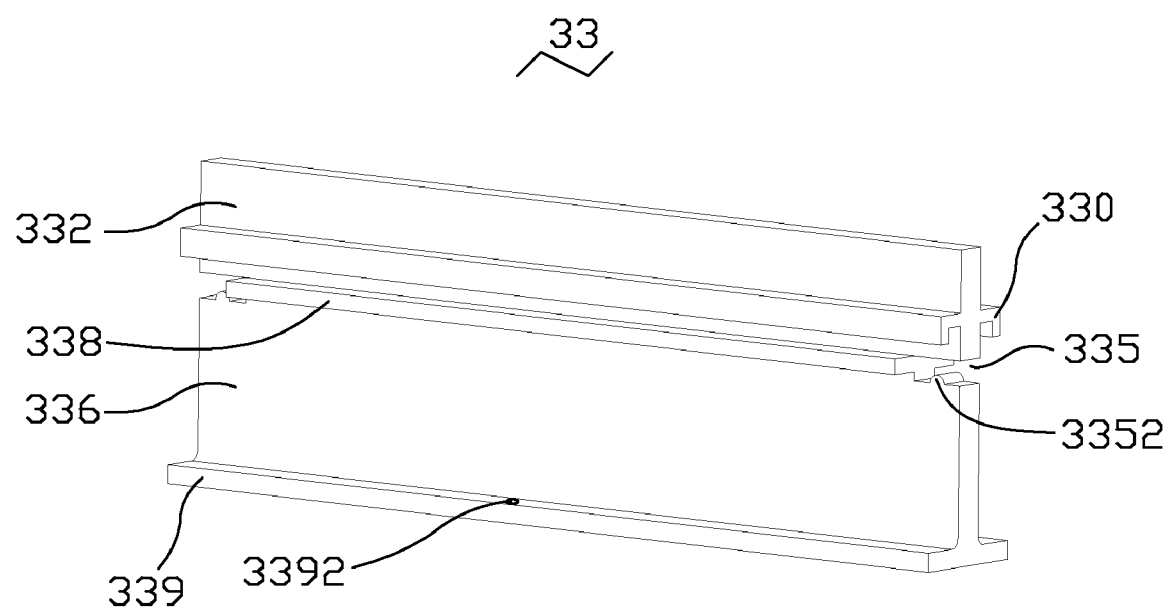
FIG. 3(B) is a schematic view of a supporting member of FIG. 3.
Figure 3C:
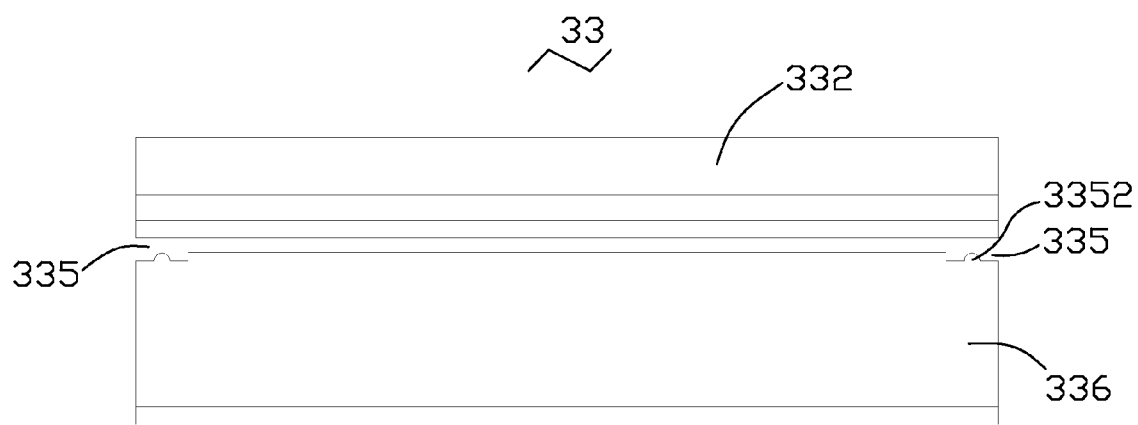
FIG. 3(C) is a front view of FIG. 3.
Figure 3:
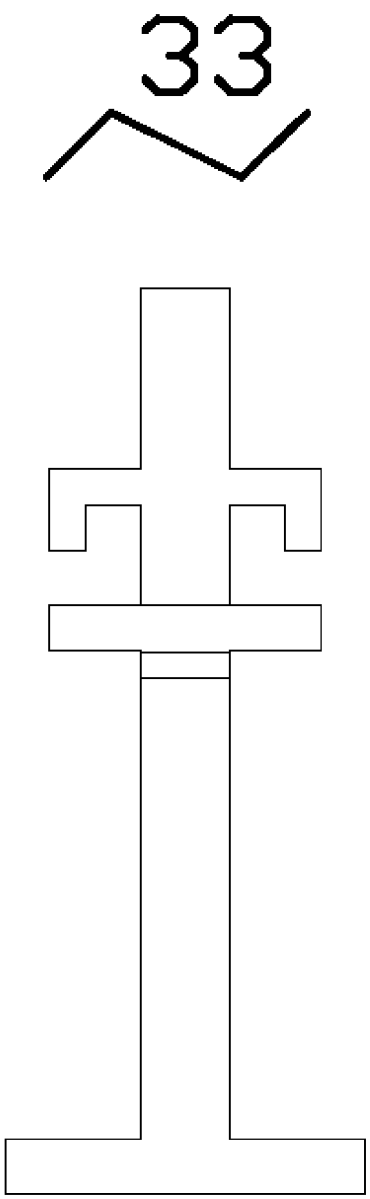
Figure 3:
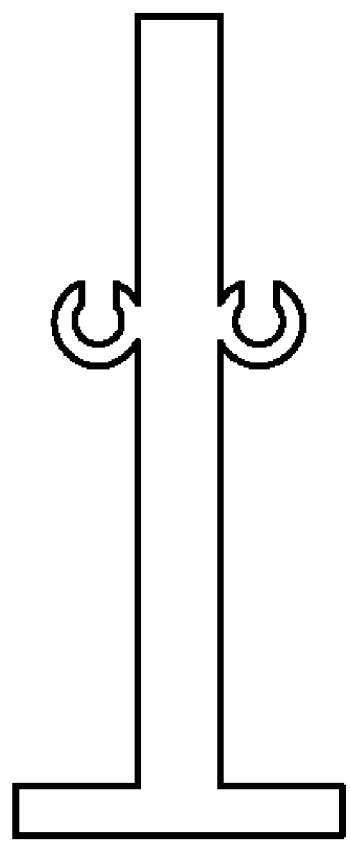
Figure 3:
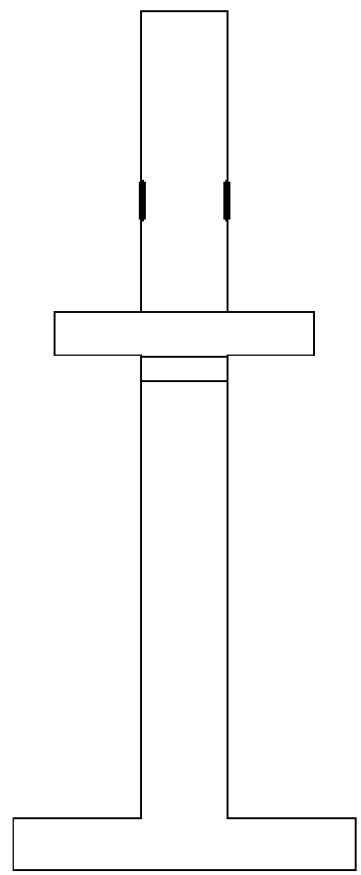
Figure 3:
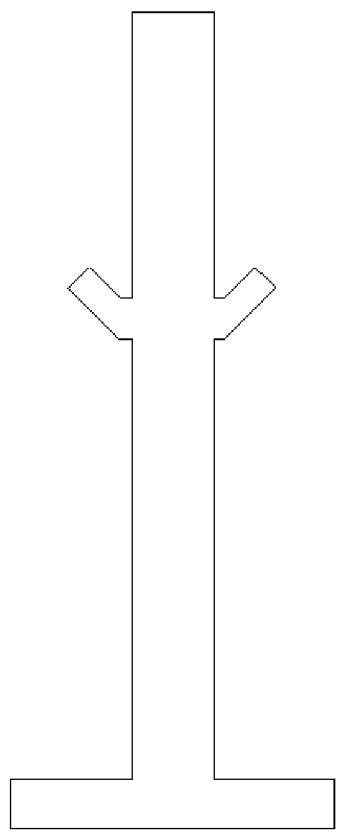
Figure 3:
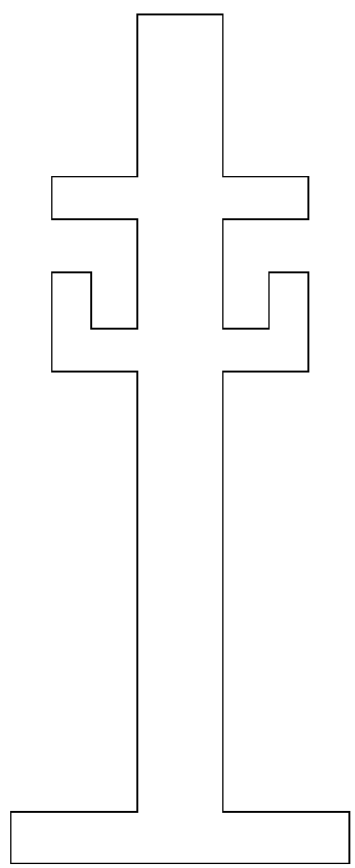
Figure 3:
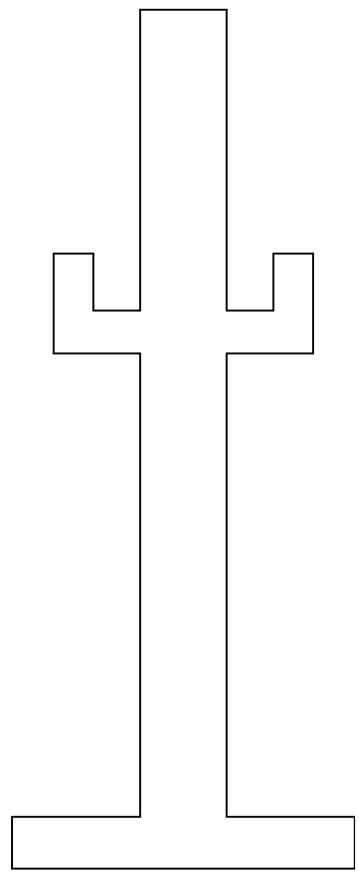

Referring to FIG. 3, a heat-absorbing unit 32 of the air conditioning device 100 is shown. The heat-absorbing unit 32 comprises a pair of supporting members 33 and a heat-absorbing plate 35 connecting the supporting members 33 together. Please referring to FIG. 3(A), a heat-absorbing plate 35 of the heat-absorbing unit 32 is shown. The heat-absorbing plate 35 is a thin board having a determined length and made of good thermal conductivity materials with black surface. The heat-absorbing plate 35 forms a pair of protruding flanges 352 extending upwardly from two opposite lateral sides thereof along the longitudinal direction. Referring to FIGS. 3(B)-3(C), a supporting member 33 of the heat-absorbing unit 32 is shown. The supporting member 33 is made of a material easy to be manufactured. The supporting member 33 has a substantially same longitudinal length as that of the heat-absorbing plate 35. The supporting member 33 not only evenly supports the transparent panel 38 thereon but also acts waterproofing works to the heat-absorbing set 31. The supporting member 33 comprises an upper supporting member 332 located above the heat-absorbing plate 35 and a lower supporting member 336 located below the heat-absorbing plate 35. The supporting member 33 further comprises two fasteners 330 formed from two opposite sides of the upper supporting member 332, a bearing seat 338 located below the two fasteners 330 and a base plate 339 extending perpendicularly from a bottom of the lower supporting member 336. Each fastener 330 comprises a horizontal plate (not labeled) and a vertical plate (not labeled) extending downwardly from a side of the horizontal plate in a manner such that a space is defined between the vertical plate of the fastener 330 and the lower supporting member 336. The bearing seat 338 horizontally extends beyond the lower supporting member 336 for supporting the heat-absorbing plate 35 thereon. A pair of opposite cutouts 335 are defined at front and rear ends of the bearing seat 338 for insertion of the connecting unit 36. The lower supporting member 336 extends upwardly from a center of the base plate 339. The lower supporting member 336 forms a pair of semi-circular protrusions 3352 toward and located at the cutouts 335. The protrusions 3352 are located at front and rear ends of the bearing seat 338. The heat-absorbing units 32 are thin and handy for displaying, packaging, storage, transportation and assembly.

Referring to FIGS. 3(C1)-3(C6), the supporting member 33 may be any desirable pattern, such as other supporting members 33c2, 33c3, 33c4, 33c5, 33c6 with different fasteners (not labeled). The supporting member 33c3 is formed by the supporting member 33 cut away the fasteners 330. A configuration of the protruding flange 352 of the heat-absorbing plate 352 should be varied corresponding to the corresponding fastener to ensure a steady engagement between the heat-absorbing plate 35 and each corresponding supporting member 33, 33c2, 33c3, 33c4, 33c5, 33c6.

Referring to FIGS. 3-3(B), in assembly of the heat-absorbing unit 32 of the air conditioning device 100, two opposite fasteners 330 of inner sides of the two adjacent supporting members 33 engage with the protruding flanges 352 of the heat-absorbing plate 35, which means the protruding flanges 352 are inserted in the space between the vertical plate of the fasteners 330 and the lower supporting member 336. Simultaneously, bottoms of the two protruding flanges 352 are supported on the bearing seat 338 of the supporting members 33.

Figure 4A:
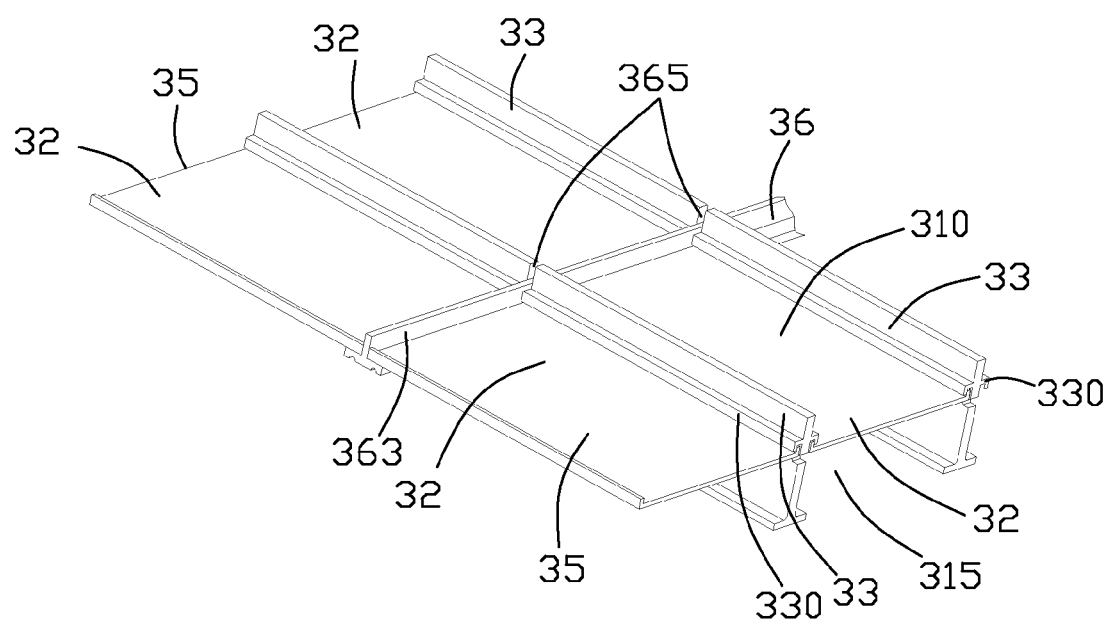
FIG. 4(A) is an assembled, schematic view of four of the heat-absorbing unit in FIG. 3 assembled together, wherein two supporting members are not shown in a longitudinal direction.
Figure 4B:
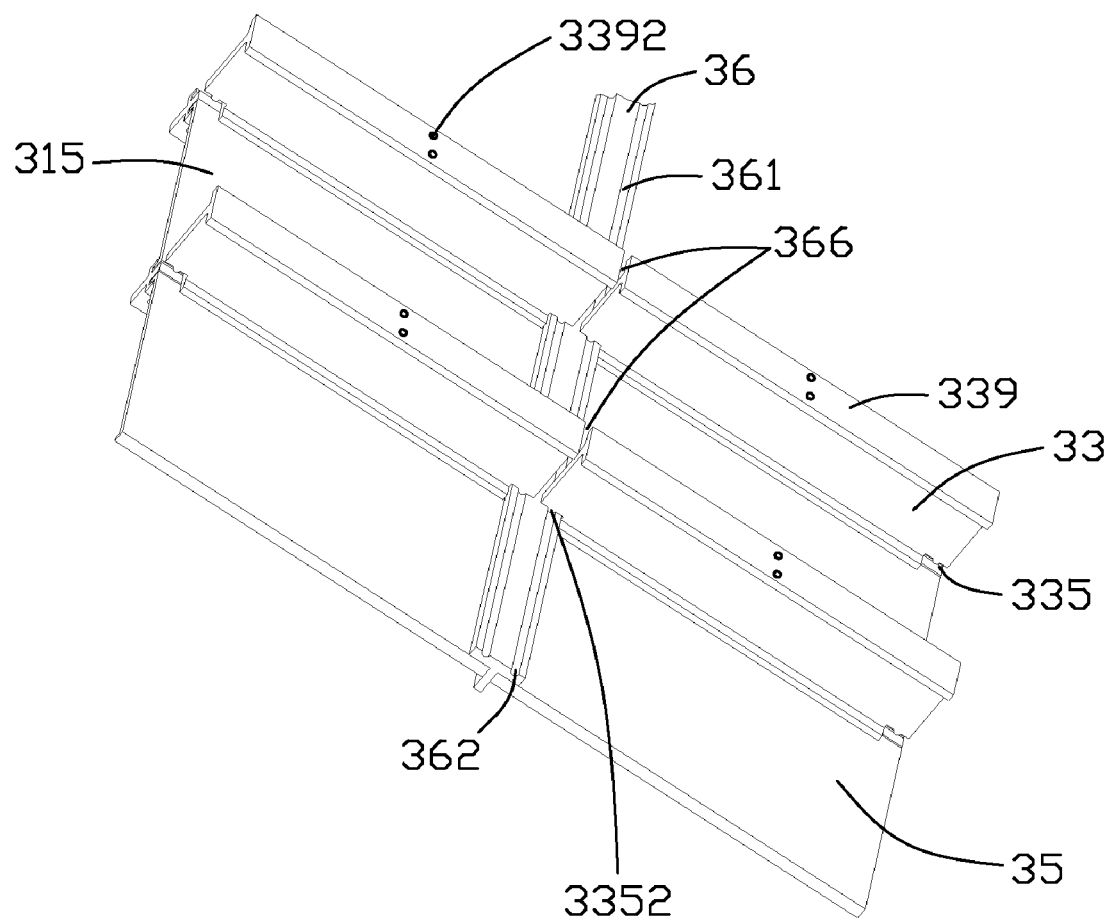
FIG. 4(B) is a similar view of FIG. 4(A), but shown from another aspect.

Referring to FIGS. 4(A)-4(B), four heat-absorbing units 32 are connected with each other in the transverse direction by means of the fasteners 330 engaging with the heat-absorbing plates 35, and in the longitudinal direction by means of four heat-absorbing units 32 engaging with the corresponding connecting unit 36.

Figure 4C:
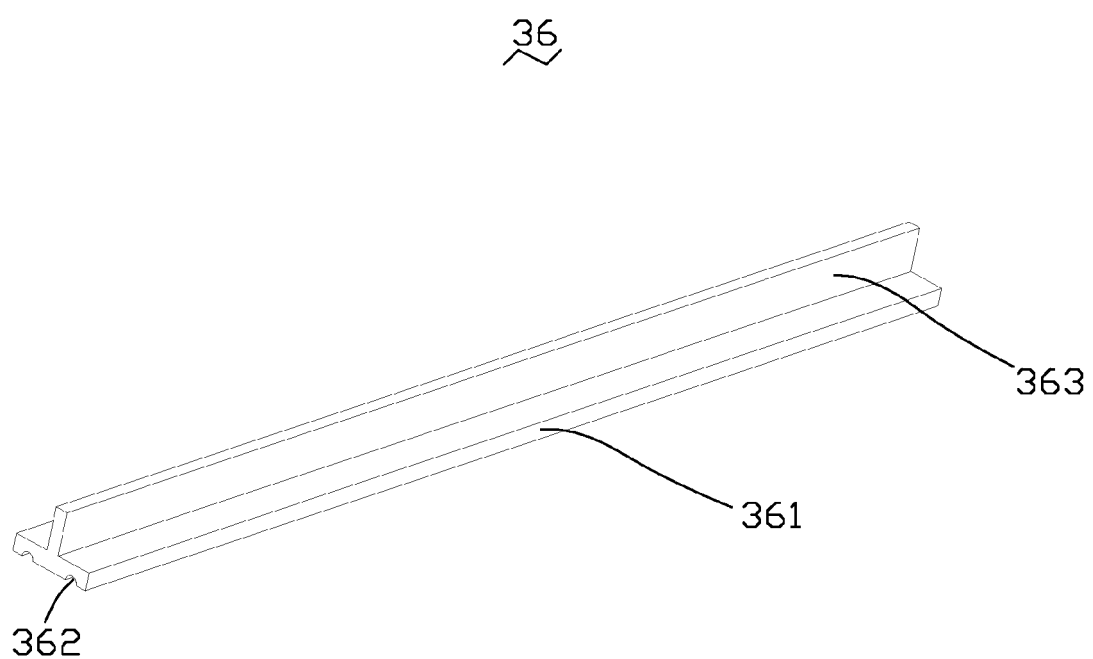
FIG. 4(C) is a schematic view of a connecting unit of FIG. 1.
Figure 4D:
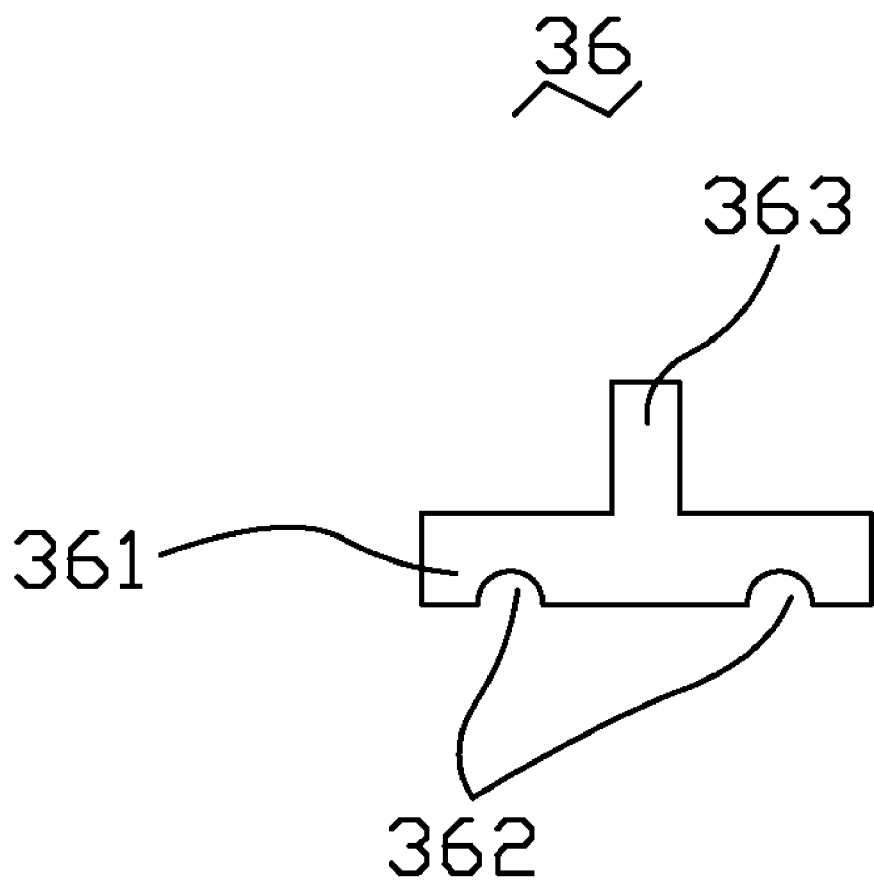
FIG. 4(D) is a side view of FIG. 4(C)

Referring to FIGS. 4(C)-4(D), the connecting unit 36 comprises an elongated plate 361 and an elongated clapboard 363 perpendicularly extending from a top of the plate 361. The lapboard 363 extends along the longitudinal direction of the plate 361 and is located at a center of the plate 361. The plate 361 defines a pair of slots 362 at a bottom thereof and symmetrically located at flanks of the lapboard 363. Also referring to FIGS. 4(A) and 4(B), in assembly, the clapboard 363 is sandwiched between two adjacent heat-absorbing plates 35 along the longitudinal direction. The plate 361 located at flanks of the lapboard 363 are inserted in two adjacent two cutouts 335 of the bearing seat 338 of the supporting member 33. The protrusions 3352 in the cutouts 335 are engaged in the slots 362 of the plate 361 of the connecting unit 36. A plurality of spaces 365, 366 is defined between two longitudinally adjacent supporting members 33 to communicate with the heat-absorbing channels 315 defined in the upper heat-retention cavities 310 and lower heat-absorbing cavities 312. The lower supporting member 336 defines a plurality of fixing holes 3392 for providing passage of screws (not shown) to fix the heat-absorbing units 32 onto the bottom plate 39 (shown in FIG. 2) of the solar collector assembly 30.

Figure 5:
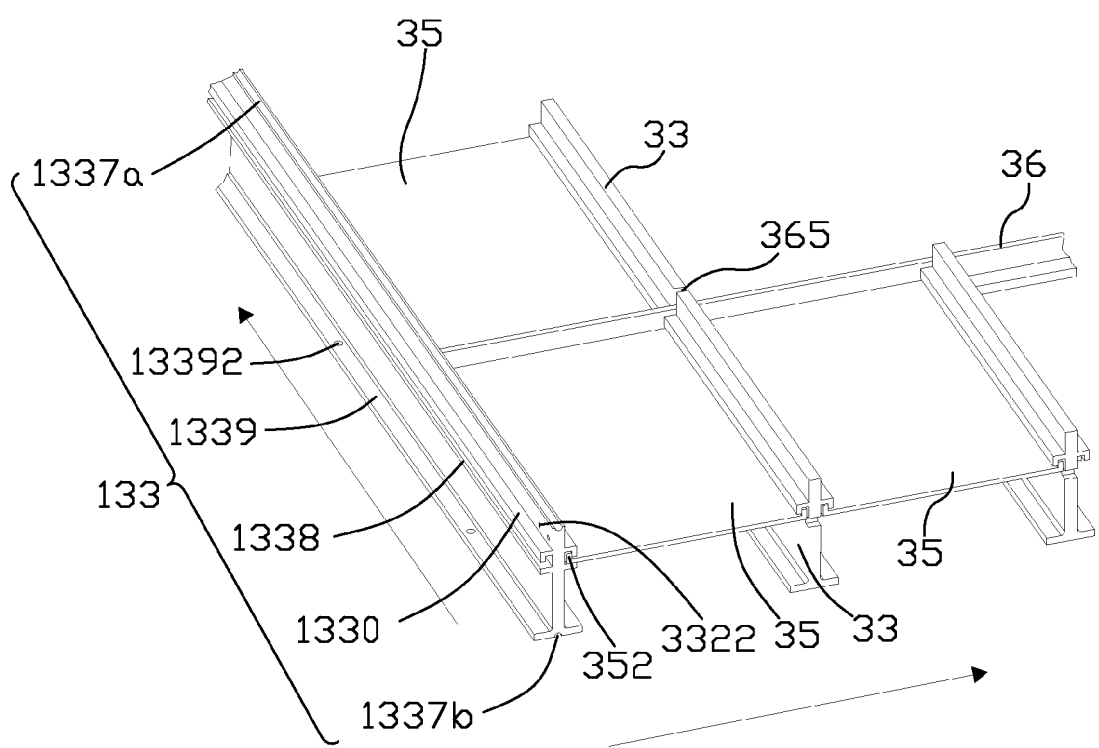
FIG. 5 is an assembled, schematic view of three of the heat-absorbing unit in FIG. 3 assembled together, wherein a long supporting member is mounted sides of the heat-absorbing plates in the longitudinal direction.

Referring to FIG. 5, three heat-absorbing units 32 are connected together. In order to prevent water from entering into the solar collector assembly 30, two adjacent separated supporting members 33 located at two opposite longitudinal sides of the solar collector assembly 30 can be replaced by a unitary long supporting member 133 having a same length as that of the two adjacent supporting members 33. The long supporting member 133 forms fasteners 1330, a bearing seat 1338 and a base plate 1339 extending perpendicularly from a bottom thereof. The fasteners 1330 have a similar configuration to that of the fasteners 330 of the supporting member 33, for engaging with the corresponding protruding flanges 352 of the heat-absorbing plates 35 located at two opposite longitudinal sides of the solar collector assembly 30. A plurality of mounting holes 3322 is defined near a top of the long supporting member 133. The bearing seat 1338 has a similar configuration to the bearing seat 338 of the supporting member 33. The heat-absorbing plates 35 are supported on the bearing seat 1338 of the long supporting member 133. Opposite ends of the connecting units 36 abut against inner sides of the long supporting member 133 in a manner such that a movement of the connecting units 36 in the solar collector assembly 30 is prevented.

Figure 6:
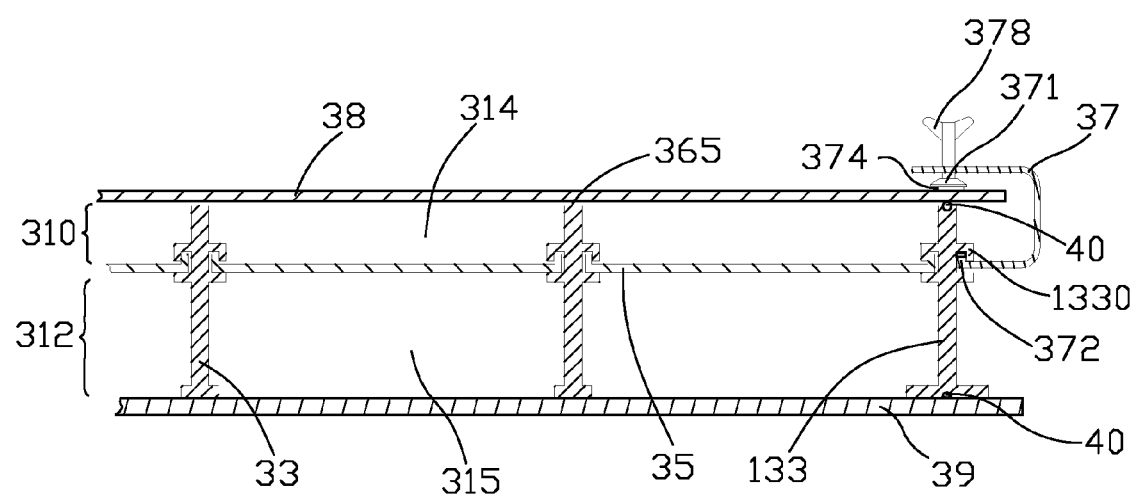
FIG. 6 is a cross-sectional view of the portion of the solar air conditioning device, taken along section A-A in FIG. 1.

Referring to FIG. 6, the air channels 314 are defined in the upper heat-retention cavities 310, which are defined by the transparent panel 38 and the heat-absorbing plates 35. The heat-absorbing channels 315 are defined by the heat-absorbing plates 35 and the bottom plate 39. In order to reduce possible heat loss from the transparent panel 38, two approaches can be taken. The first approach is to close entrances and exits of the air channels 314 of the heat-retention cavities 310. The second approach is to reduce a height ratio between the upper supporting members 332 and the lower supporting members 336. Both of these approaches allow air to be heated mainly in the lower heat-absorbing channels 315. Therefore, since the solar air conditioning device 100 has only one transparent panel 38, most air goes through the lower heat-absorbing channels 315 and the device 100 demonstrates excellent heat insulation as well improving heating efficiency.

The transparent panels 38 can improve heat collection and retention of the solar air conditioning device 100 as sunshine can easily radiate through the transparent panel 38 but cannot escape through convection. Thus, solar energy can easily be absorbed by the heat-absorbing units 32 and used to heat air in the heat-absorbing channels 315; thus, the solar air conditioning device 100 has a wide surface for absorbing solar energy. The transparent panel 38 not only can have a flat-plate typed configuration but also a corrugated configuration. Material of the transparent panel 38 can be chosen from a group of glass, fiberglass, and plastic. The material of the transparent panel 38 should be transparent and weatherproof, and easily cut. It is therefore not necessary to attach the transparent panel 38 to a fixed outer frame insulation chamber (not shown) with a fixed envelop of a related solar air conditioning device (not shown). Thus, in the related solar air conditioning device, due to different coefficients of thermal expansion between the transparent panel and the fixed outer frame insulation chamber, components of the related solar air conditioning device tend to deform or break. The solar air conditioning device 100 without the fixed outer frame insulation chamber can avoid the problems described above.

Referring to FIGS. 5-6, In order to prevent water from entering into the solar collector assembly 30 from the two opposite sides of the transparent panel 38 and the heat-absorbing set 31 along the heat-absorbing channels 315, the long supporting member 133 defines longitudinal recesses 1337a, 1337b at opposite top and bottom surfaces for receiving corresponding seal gaskets 40.

The solar collector assembly 30 further comprises a plurality of C-shaped clamps 37. For example, in the solar air conditioning device 100 with the flat transparent panel 38, the clamps 37 are used to connect the transparent panel 38 with the heat-absorbing units 32 and are fastened along two lateral sides of the solar collector assembly 30. Each C-shaped clamp 37 comprises a pressing portion 371 downwardly extending from a top end thereof and a clasp portion 372 upwardly bent from a bottom end thereof. A handle 378 corresponds to the pressing portion 371 and is used to fix the clamp 37 in place. To obtain a better effect, the clasp portions 372 of the C-shaped clamps 37 can engage with the fasteners 1330 of the long supporting member 133. Moreover, the pressing portions 371 of the C-shaped clamps 370 can be first attached to a steel bar (not shown); accordingly, a soft gasket 374 should be located between the steel bar and the transparent panel 38. Thus, the transparent panel 38 can be supported more uniformly and the heat-absorbing set 31 can have better waterproofing. It should be noted that the gasket 374 can also be pre-assembled on edges of the transparent panel 38 and cover contacting surfaces between the transparent panel 38 and the pressing portions 371.

Figure 7:
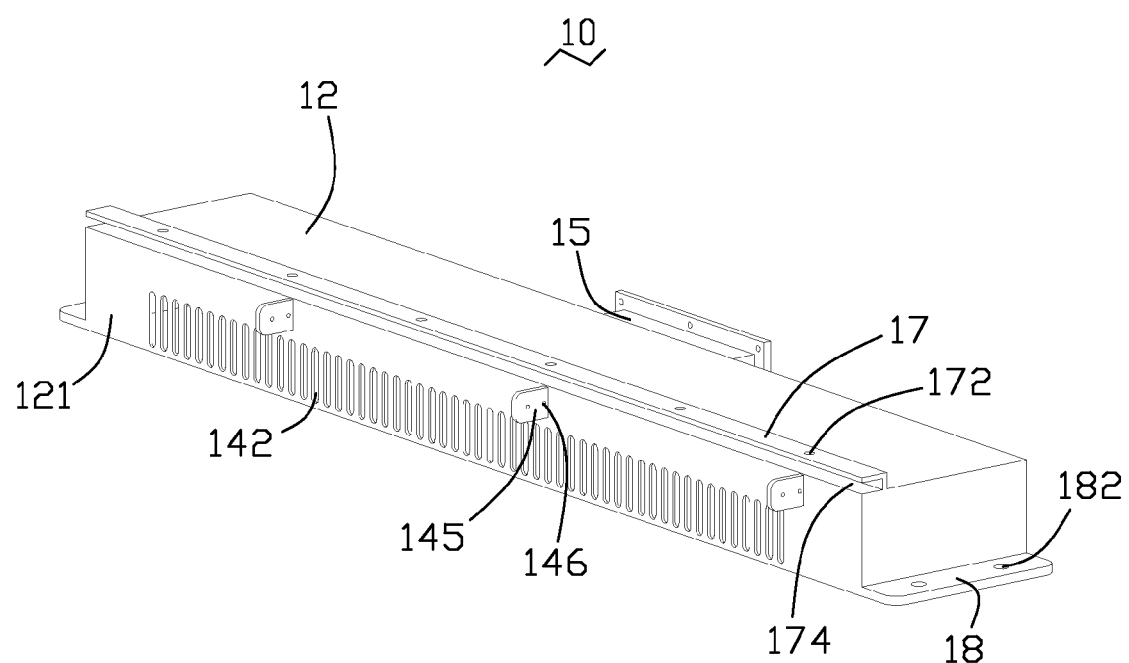
FIG. 7 is a schematic view of an inlet assembly of the solar air conditioning device in accordance with the present invention.
Figure 8:
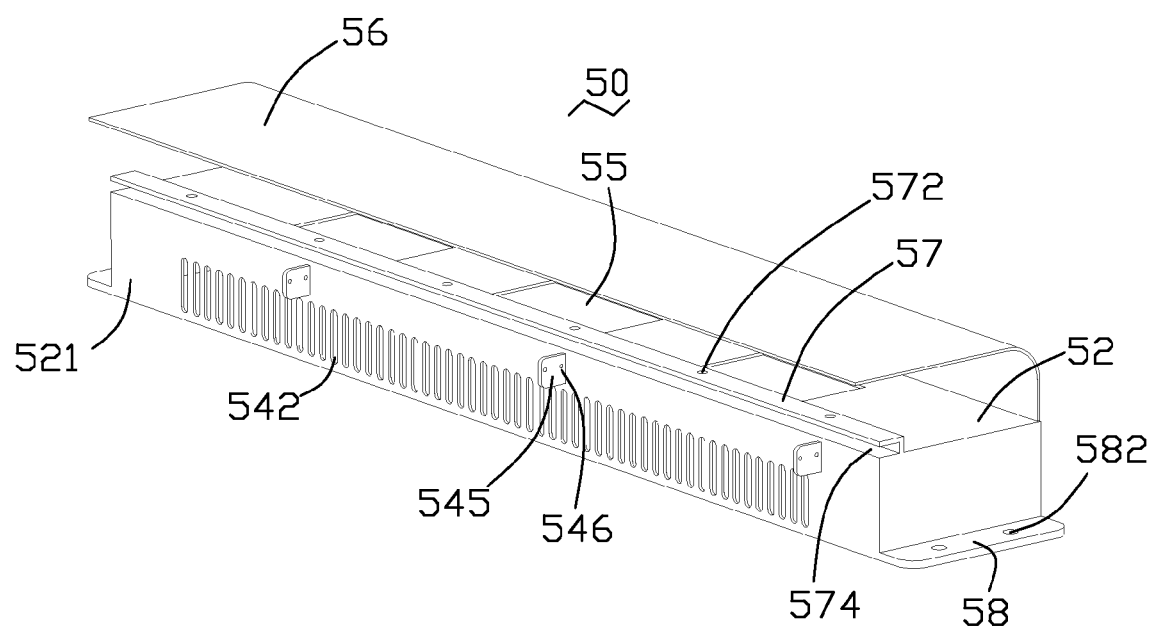
FIG. 8 is a schematic view of an outlet assembly of the solar air conditioning device in accordance with the present invention.

FIGS. 7 and 8 are respectively schematic views of the inlet assembly 10 and the outlet assembly 50 of the solar air conditioning device 100. As shown in FIG. 2, the inlet assembly 10 and the outlet assembly 50 are connected with an entrance (not labeled) and an exit (not labeled) of the solar air conditioning device 100 respectively, as the air channels 314 of the heat-absorbing cavities 312 of the solar collector assembly 30 communicate with the inlet assembly 10 and the outlet assembly 50. The inlet assembly 10 connects to interior exhaust pipes (not shown). Stale air from the interior can be guided into the heat-absorbing channels 315 through the inlet assembly 10, then heated in the heat-absorbing channels 315 of the solar collector assembly 30, and finally expelled to the exterior through the outlet assembly 50. Meanwhile, cool and fresh air can be guided into the interior through other channels or devices. All in all, the solar air conditioning device 100 is good for health and for saving energy.

The inlet assembly 10 has a similar configuration with the outlet assembly 50. The inlet assembly 10 comprises a hollow and rectangular casing 12. The casing 12 has a folding wall 17 extending outwardly from a top portion thereof. The folding wall 17 is near an edge of the top portion of the casing 12 and forms a rectangular groove 174 opening to a front side of the casing 12. A plurality of mounting holes 172 is defined in a top portion of the folding wall 17. The casing 12 is secured to the solar collector assembly 30 by the folding wall 17 and sealed with the transparent panel 38. The casing 12 has a partition 121 in the front side thereof. A plurality of air holes 142 is defined in a lower half portion of the partition 121. The air holes 142 are arranged at predetermined intervals. A plurality of connecting portions 145 extends perpendicularly from an upper half portion of the partition 121. The connecting portions 145 are spaced from each other. Each connecting portion 145 has two mounting holes 146 defined therein. The casing 12 is connected with the heat-absorbing set 31 by extending screws (not shown) through the mounting holes 146 of the connecting portions 145 and the mounting holes 3322 of the supporting member 33, 133 to threadedly engage with nuts (not shown). The connecting manner between the casing 12 and the heat-absorbing set 31 is similar to that between the heat-absorbing units 32 which is clearly shown in FIG. 4(A). Two connecting projections 18 extend horizontally from a bottom portion of lateral sides of the casing 12. Each of the connecting projections 18 has two mounting holes 182 defined therein. The casing 12 can be secured to a roof, a wall or a fixed board by the connecting projections 18. The casing 12 further has a hollow joint 15 in a rear side thereof. The joint 15 is used to connect to the indoor exhaust pipe. The outlet assembly 50 includes similar components to that of the inlet assembly 10, such as a casing 52, a partition 521, air holes 542, connecting portions 545, a folding wall 57, a rectangular groove 574, connecting projections 58 and mounting holes 546, 572, 582. A difference between the inlet assembly 10 and the outlet assembly 50 is that a plurality of rectangular air openings 55 is defined in a top portion of the casing 52 and a waterproof cover 56 extends outwardly from an edge of the top portion of the casing 52. Air in the casing 52 can be exchanged with the exterior through the air openings 55. The waterproof cover 56 covers the top portion of the casing 52 and is used to prevent irritants and pollutants such as, dust or mosquitoes from entering into the casing 52.

When the heat-absorbing set 31 is attached to the inlet assembly 10 and the outlet assembly 50, upper half portions of the partitions 121, 521 face toward the heat-retention cavities 33 and ensure that air in the heat-retention cavities 310 cannot flow into the inlet assembly 10 or the outlet assembly 50. The air holes 142, 542 in the lower half portions of the partitions 121, 521 communicate with the heat-absorbing channels 315; thus, air can be guided uniformly into the heat-absorbing channels 315 and heat-absorbing efficiency of the solar collector assembly 30 can be greatly improved. In order to reduce airflow resistance, the air holes 142 or the air holes 542 should preferably be twice as large as a cross-sectional area of inner holes of the indoor exhaust pipes.

Figure 9:
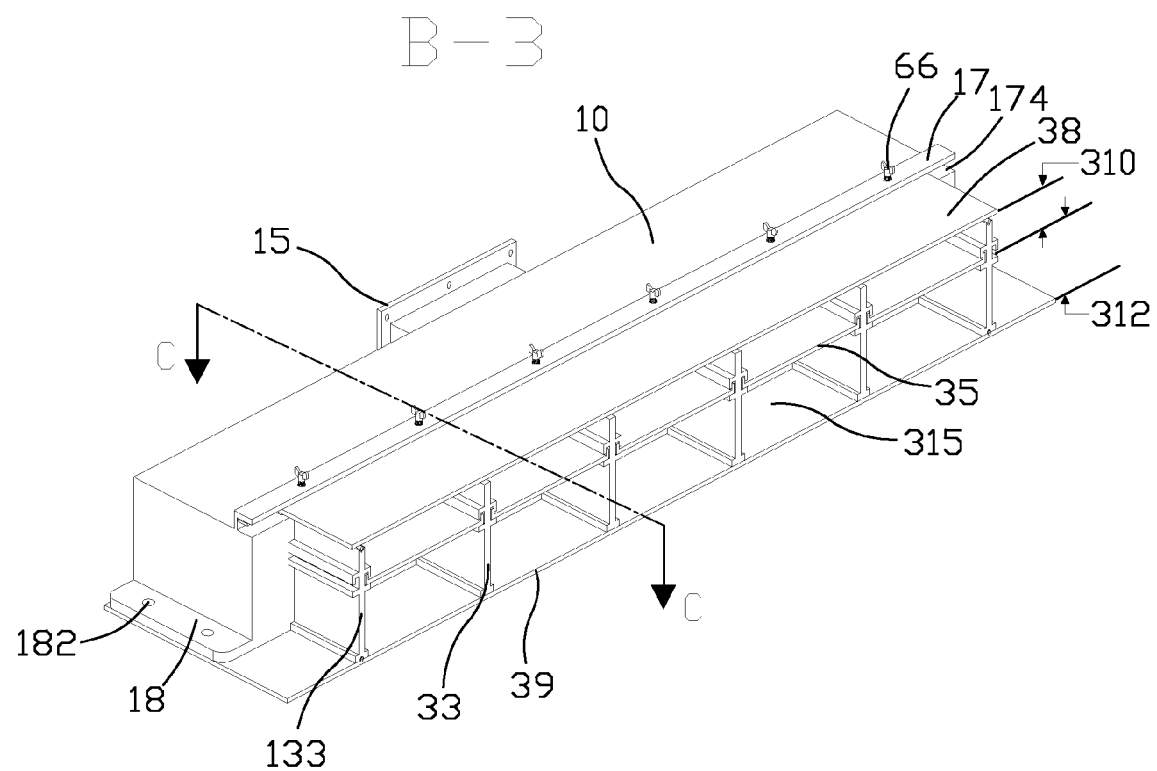
FIG. 9 is an isometric, cross-sectional view of a portion of the solar air conditioning device taken along section B-B in FIG. 1.
Figure 10:
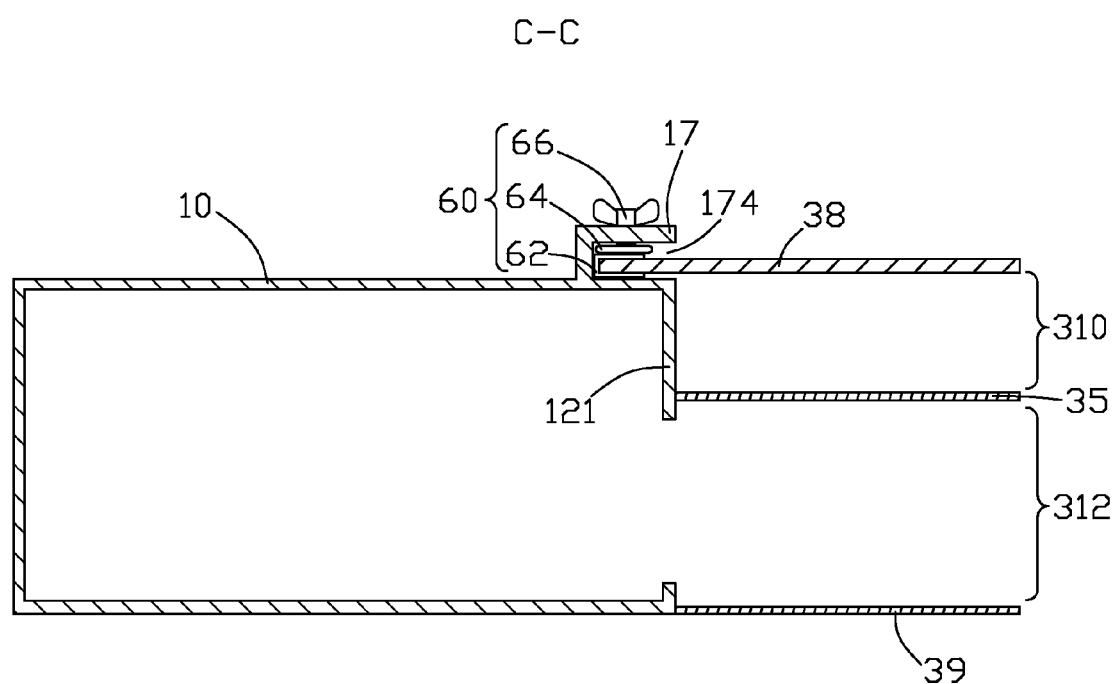
FIG. 10 is a cross-sectional view of the portion of the solar air conditioning device, taken along section C-C in FIG. 9.

FIG. 9 is a schematic view of a partial solar air conditioning device 100 cut along line B-B of the solar air conditioning device 100 of FIG. 1. FIG. 10 is a cross-sectional view of the solar air conditioning device 100, taken along line C-C of FIG. 9. The inlet assembly 10 and the outlet assembly 50 have an essentially identical waterproof configuration 60 to the transparent panel 38. For example, in the inlet assembly 10, the waterproof configuration 60 between the inlet assembly 10 and the transparent panel 38 comprises a U-shaped soft beam 62, a steel bar 64 and a plurality of screws 66. After the connecting portions 145, 545 are connected to the supporting members 33, the end of the transparent panel 38 covered with the U-shaped soft beams 62 is inserted into the rectangular groove 174; then, the steel bar 64 is inserted into space between the upper portion of the rectangular groove 174 and the U-shaped soft beams 62; then, the screws 66 are inserted through the mounting holes 172 of the folding wall 17 to abut against the steel bar 64 so that the U-shaped soft beams 62 together with the end of the transparent panel 38 are securely attached in the rectangular groove 174. Thus, the waterproof configuration 60 between the inlet assembly 10 and the transparent panel 38 is formed. The waterproof configuration 60 between the outlet assembly 50 and the transparent panel 38 can be attained in a similar way.

The solar air conditioning device 100 can be installed horizontally or vertically attached to walls. Furthermore, it can be installed at an angle. The solar collector assembly 30 can also be fixed on a board (not shown) which is fixed to the fixed object at a distance or an angle. Beneath the bottom plate 39 of the heat-absorbing set 31, a heat-insulated layer (not shown) can be installed to prevent the roof from over-heating and reduce heat dissipation from the heat-absorbing set 31. Thus, heat in the heat-retention cavities 310 can be absorbed completely by the heat-absorbing plates 35, and then conducted to airflow in the heat-absorbing channels 315 below the heat-absorbing plates 35. Thus, a heating efficiency of the solar collector assembly 30 can be improved and thermal buoyancy of air increased.

Compared with a related solar collector assembly, the solar collector assembly 30 of the solar air conditioning device 100 including the modular heat-absorbing units 32, have many advantages, such as low packaging costs, small space required for storage and display, simple assembly and simple configuration. Moreover, the solar air conditioning device 100 can be transported easily through and assembled on site. Furthermore, the heat-absorbing units 32 can be designed or assembled according to requirements of users; thus, the solar air conditioning device 100 can be used in many different structures or houses. The solar collector assembly 30 can be extended to a big configuration easily as long as assemble more the heat-absorbing units 32, so that the solar air conditioning device 100 can have large heat-absorbing areas to collect solar energy. In addition, the heat-absorbing units 32 are suitable for mass-production so that the solar air conditioning device 100 is both cheap and high quality.

Figure 11:
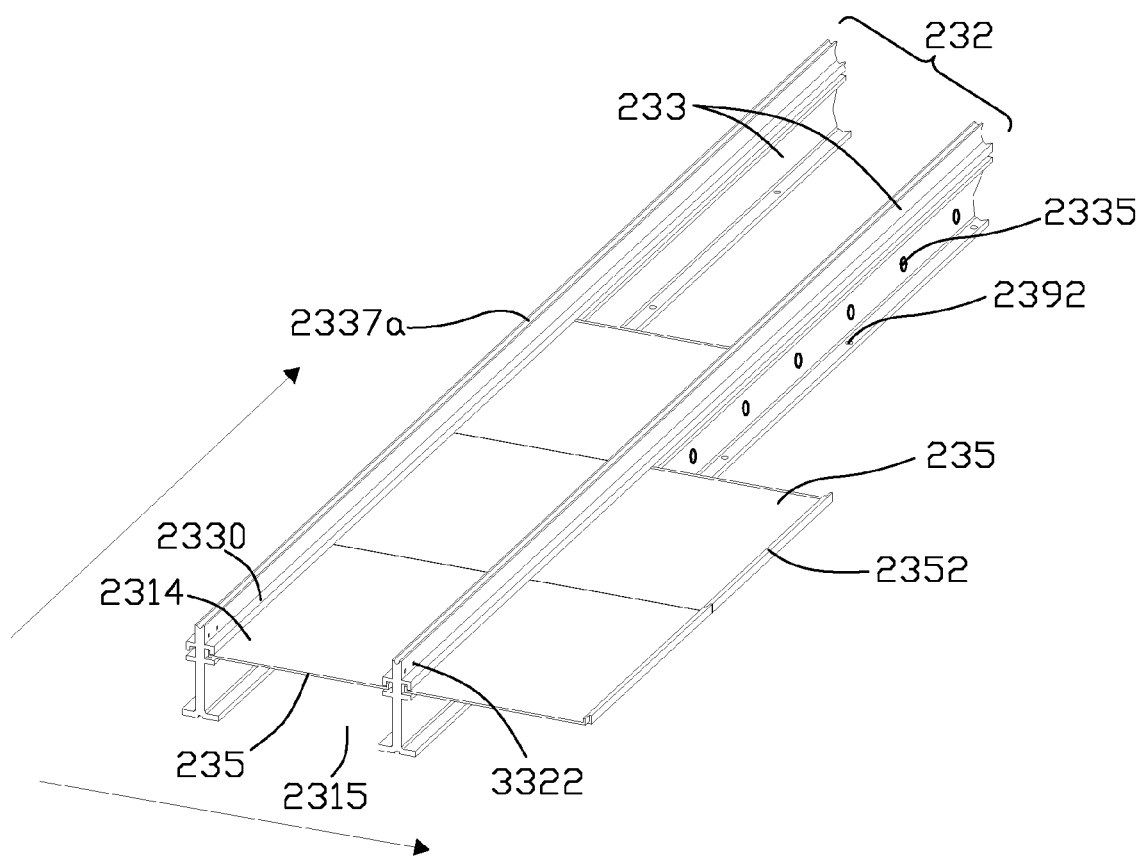
FIG. 11 is a heat-absorbing unit in accordance with the second embodiment of the present invention.
Figure 11A:
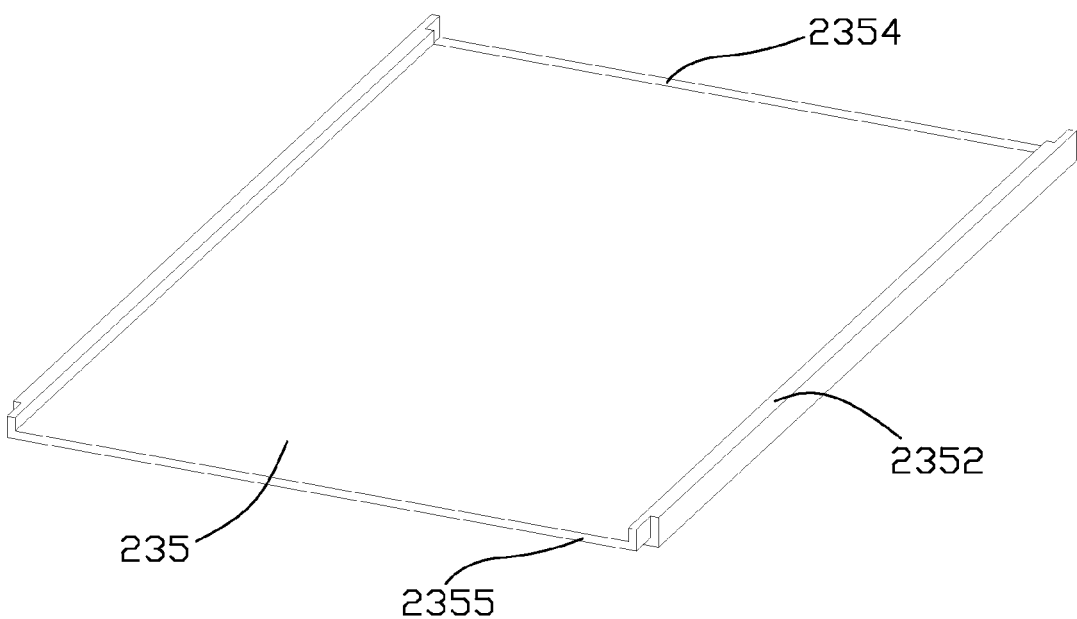
FIG. 11(A) is a schematic view of a heat-absorbing unit in accordance with a second embodiment of the present invention.

Referring to FIG. 11, a heat-absorbing unit 232 in accordance with the second embodiment of the present invention is shown. The heat-absorbing unit 232 being similar to the heat-absorbing unit 32, comprises two long supporting members 233 and a plurality of heat-absorbing plates 235 sandwiched between the two supporting members 233. Each supporting member 233 forms two fasteners 2330 similar to the fasteners 330 of the first embodiment. A total length of the heat-absorbing plates 235 is substantially equal to a length of the long supporting member 233 along the longitudinal direction. Each heat-absorbing plate 235 forms a pair of protruding flanges 2352 extending upwardly from two opposite lateral sides thereof. The protruding flanges 2352 of the heat-absorbing plates 235 engage with the fasteners 330 of the supporting members 232. Referring to FIG. 11(A), each heat-absorbing plate 235 forms two fasteners 2354, 2355 at front and rear ends thereof in a manner such that the fastener 2355 of adjacent heat-absorbing plate 235 firmly clasps the fastener 2354 of the heat-absorbing plate 235 to reduce air exchange between the heat-retention cavities 310 and the heat-absorbing cavities 312. Air channels 2314 of the heat-retention cavities 310 can communicate with each other through recesses 2337a defined top surface of the supporting member 233. Heat-absorbing channels 2315 of the heat-absorbing cavities 312 can communicate with each other through air holes 2335 defined near bottom of the supporting member 233. The supporting member 233 defines a plurality of fixing holes 2392 for providing passage of screws to fix the heat-absorbing units 232 onto the bottom plate 39 (sown in FIG. 2) of the solar collector assembly 30.

Figure 12:
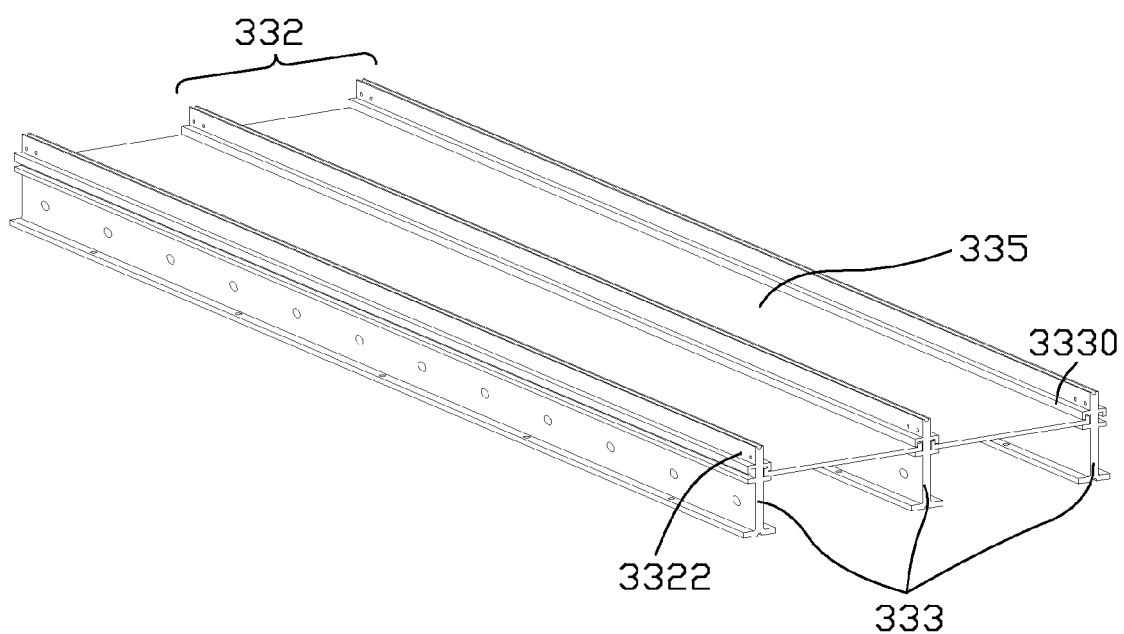
FIG. 12 is a schematic view of a heat-absorbing unit in accordance with a third embodiment of the present invention.
Figure 12A:
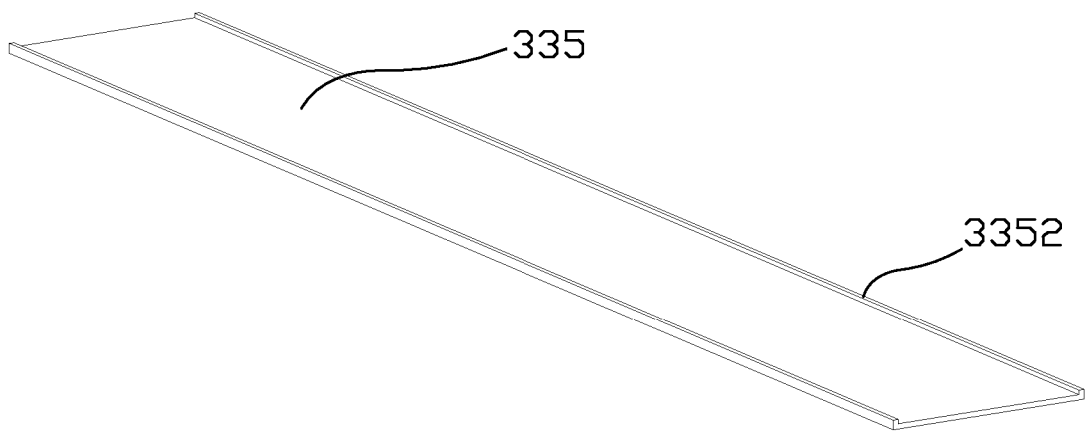
FIG. 12(A) is a heat-absorbing plate for engaging with the heat-absorbing unit of FIG. 12.

Referring to FIGS. 12 and 12(A), a heat-absorbing unit 332 in accordance with the third embodiment of the present invention is shown. The heat-absorbing unit 332 comprises a pair of long supporting members 333 and a long heat-absorbing plate 335 sandwiched between the two long supporting members 333. Each supporting member 333 forms two fasteners 3330 same as the fasteners 2330 of the second embodiment. The heat-absorbing plate 335 has a same length as that of the long supporting member 333 along the longitudinal direction. The heat-absorbing plate 335 forms a pair of protruding flanges 3352 extending upwardly from two opposite lateral sides thereof. The protruding flanges 3352 of the heat-absorbing plate 335 engage with the fasteners 3330 of the supporting member 333.

Figure 13:
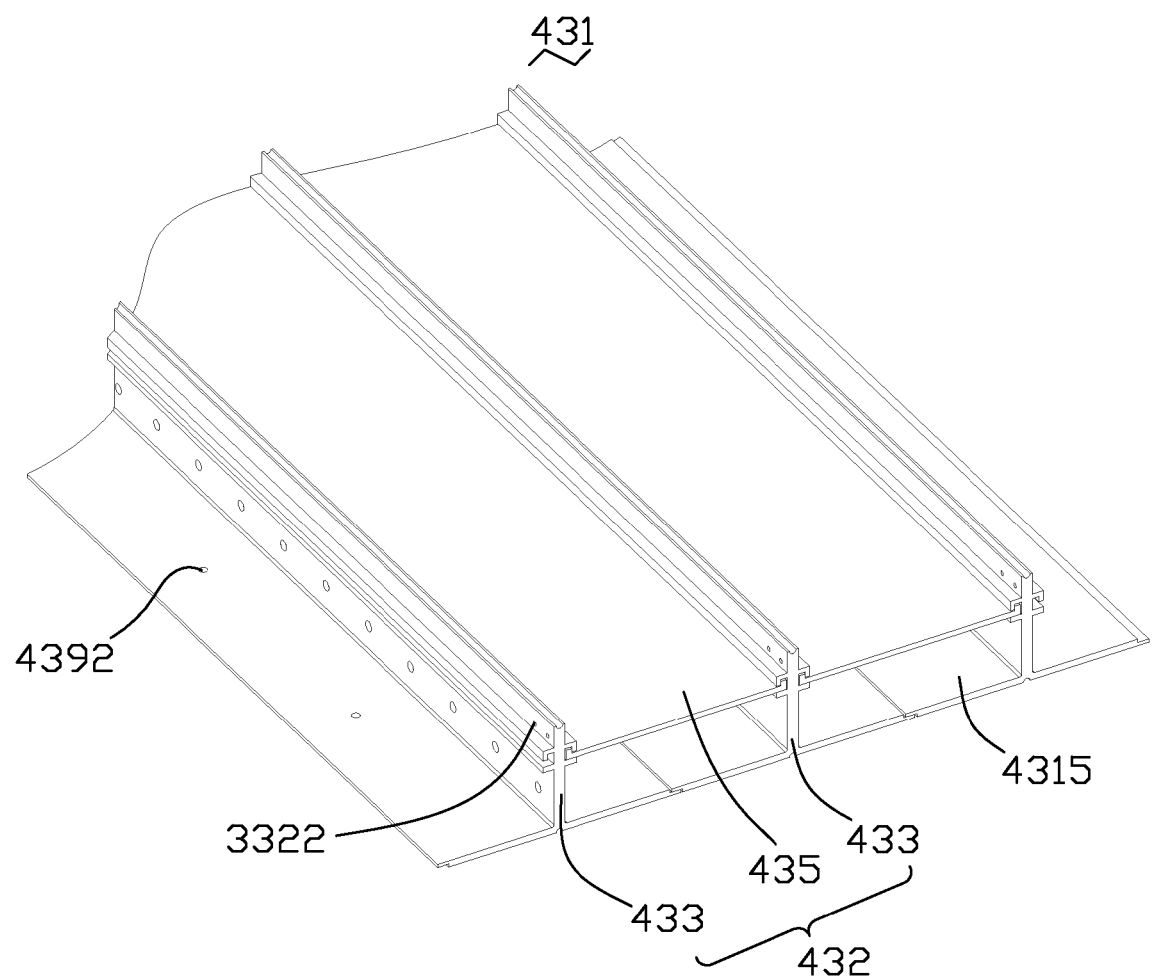
FIG. 13 is a schematic view of a heat-absorbing unit in accordance with a fourth embodiment of the present invention.
Figure 13A:
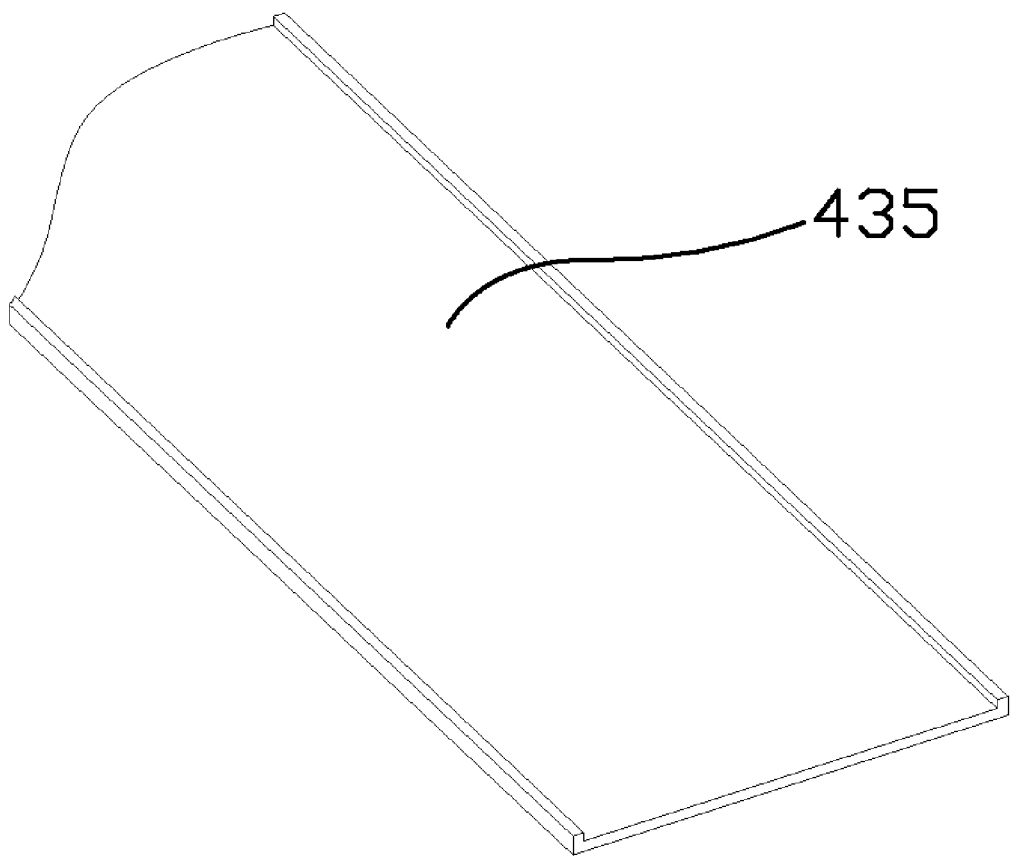
FIG. 13(A) is a heat-absorbing plate for engaging with the heat-absorbing unit of FIG. 13.
Figure 13B:
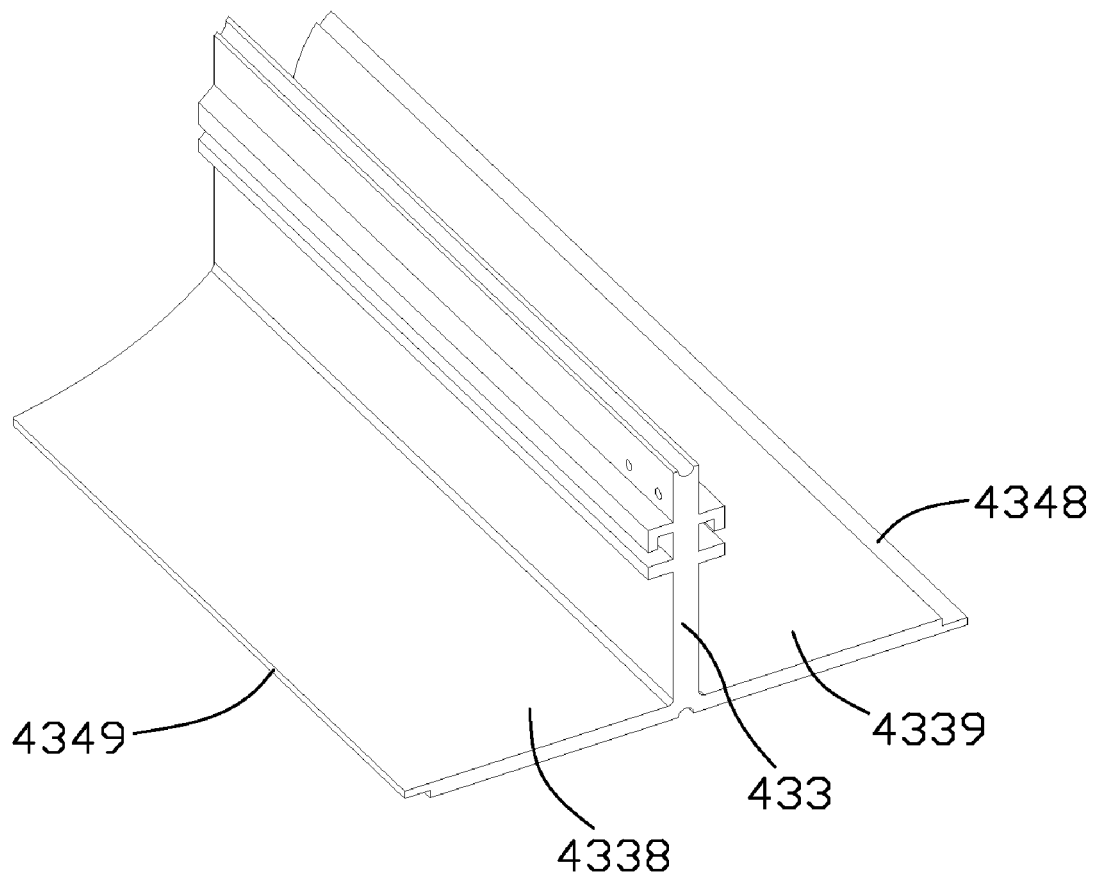
FIG. 13(B) is a schematic view of a supporting member of FIG. 13.

Referring to FIG. 13, a heat-absorbing unit 432 in accordance with a fourth embodiment of the present invention is shown. Also referring to FIGS. 13(A) and 13(B), the heat-absorbing unit 432 comprises a pair of supporting members 433 and a heat-absorbing plate 435 having a same configuration as that of the heat-absorbing plate 335 of the third embodiment. A difference between the heat-absorbing unit 432 of the fourth embodiment and the heat-absorbing unit 332 of the third embodiment is that two base plates 4338, 4339 extend horizontally from a bottom of each supporting member 433 along two opposite directions. A fixture 4348 is formed at a free side of the bottom board 4339 and another fixture 4349 is formed at a free side of the bottom board 4338. The fixture 4348 engages with the fixture 4349 of an adjacent heat-absorbing unit 432. A plurality of heat-absorbing channels 4315 is defined by the heat-absorbing plates 435 and the base plates 4338, 4339.

In summer, the solar air conditioning device 100 can heat stale air guided from the interior exhaust pipes connecting with a room (not shown) and expel the heated stale air out of the room using thermal buoyancy. At the same time, cool and fresh air from the exterior can be guided into the room, or air from the exterior can be cooled and guided into the room through other devices (not shown) or channels (not shown). Thus, in summer, air in the room can be kept fresh and cool all the time.

In winter, air through the interior exhaust pipes can be heated in the solar collector assembly 30 of the solar air conditioning device 100 and guided to the room via a fan (not shown) connected with the interior exhaust pipes. Furthermore, when fresh air from the exterior is guided to mix with air in the interior exhaust pipes and further heated in the solar collector assembly 30, the inlet assembly 10 should communicate with the interior exhaust pipes and the air openings 55 of the casing 52 should be opened. The fan draws the fresh air through the solar air conditioning device 100 to the indoor room.

The solar air conditioning device 100 can be installed with a hot water supply system (not shown) which can operate year-round. A plurality of heat-absorbing water pipes (not shown) are arranged in the heat-retention cavities 310 of the solar air conditioning device 100, then heated water is transferred back to a water circulation circuit (not shown) including a heat storage tank (not shown). Meanwhile, air is heated in the heat-absorbing channels 315 of the solar air conditioning device 100.

The solar air conditioning device 100 in accordance with the present invention has many features that are superior to the related solar air conditioning devices. With its modular design, the solar air conditioning device 100 provides users with greater compatibility in application as well as more selection and freedom in assembly. The solar air conditioning device 100 can be installed in all kinds of structures and vehicles, including ones that are under construction or currently existing ones. The solar air conditioning device 100 can be installed horizontally or vertically attached to walls. Furthermore, it can be installed at an angle. The solar air conditioning device 100 can also provide excellent heat insulation and protection to the structure.

The heat-absorbing units 32, 232, 332, 432 used in the solar air conditioning device 100 can be flexibly expanded as desired to the most optimal absorption surface area to fully absorb and collect heat energy. Therefore, the solar air conditioning device 100 does not need a fixed outer frame insulation chamber like the one used in the related solar air conditioning assembly. The solar air conditioning device 100 also needs no special consideration for the heat efficiency of each individual unit, as the related models do. One special feature of the solar air conditioning device 100 is that although it only has one layer of transparent panel in its structure, because most air goes through the lower heat-absorbing channels 315, the solar air conditioning device 100 has the excellent insulation effect of a double-glazed system and very high heat-absorption efficiency.

Compared with the related models, the solar air conditioning device 100 has a lighter and thinner structure and appearance, and thus it does not cause an overly heavy load to structures. The commercially available flat transparent panel 38 and corrugated transparent panel 38a can maintain the harmony and aesthetics of the existing structures. Furthermore, since the installation of the transparent panels 38, 38a does not have to be glazed into the outer frame of the heat-insulated chamber as one must in the related model, the thermal expansion coefficient of materials used in the solar air conditioning device 100 will not cause thermal stress problems related to deformation or cracking.

The solar air conditioning device 100 is designed according to a modular concept. Cost of the solar air conditioning device 100 is greatly reduced because the heat-absorbing units 32, 132, 232, 432 are made of thin boards and plates. The solar air conditioning device 100 is much simpler than related assemblies with whole-unit designs. The assembly not only saves expenses in packaging but also requires less room for display and storage to make channel marketing much easier. The solar air conditioning device 100 is very easy to install and maintain such a system. Moreover, users can install and assemble the system by themselves.

What is claimed is:

1. A solar air conditioning device comprising:
  a solar collector assembly, comprising:
    a heat-absorbing set comprising a plurality of heat-absorbing units, the heat-absorbing units engaging with each other, each of the heat-absorbing units comprising two adjacent supporting members and a heat-absorbing plate sandwiched between and buckled with the two adjacent supporting members;
    a transparent panel assembled to a top of the heat-absorbing set, an air channel defined between the transparent panel and the heat-absorbing set, and a heat-absorbing channel defined below the air channel and hermetically isolated from the air channel;
    an inlet assembly installed at an entrance of the solar collector assembly; and
    an outlet assembly installed at an exit of the solar collector assembly;
    wherein the inlet and outlet assemblies communicate with opposite ends of the heat-absorbing channel, respectively, whereby air can flow from the inlet assembly to the outlet assembly via the heat-absorbing channel and vice versa;
    wherein each of the supporting members forms fasteners at two opposite lateral sides thereof, the heat-absorbing units being assembled by engagement between the fasteners of the supporting members and the heat-absorbing plate in a transverse direction; and
    wherein each of the fasteners defines a space therein, the heat-absorbing plate forming a pair of protruding flanges extending substantially perpendicularly from two opposite lateral sides thereof, the protruding flanges being engaged in the spaces of the fasteners of two adjacent supporting members.

2. The solar air conditioning device as claimed in claim 1, wherein the heat-absorbing set further comprises a plurality of connecting units connecting adjacent two heat-absorbing units in a longitudinal direction, and a length of each of the heat-absorbing plates is substantially equal to that of the supporting member.

3. The solar air conditioning device as claimed in claim 2, wherein each of the supporting members comprises an upper supporting member located above the heat-absorbing plate and a lower supporting member located below the heat-absorbing plate, the two fasteners symmetrically formed from two opposite sides of the upper supporting member.

4. The solar air conditioning device as claimed in claim 3, wherein each of the supporting members further comprises a bearing seat located below the two fasteners and a base plate extending perpendicularly from a bottom of the lower supporting member, the bearing seat supporting the heat-absorbing plate thereon.

5. The solar air conditioning device as claimed in claim 4, wherein the base plates of two adjacent supporting members are spaced from each other.

6. The solar air conditioning device as claimed in claim 4, wherein a pair of opposite cutouts are defined at front and rear ends of the bearing seat of each of the supporting members, each of the connecting units comprising an elongated plate and an elongated clapboard perpendicularly extending from a top of the elongated plate, the clapboard sandwiched between two adjacent heat-absorbing plates along the longitudinal direction, the elongated plate being located at flanks of the clapboard and inserted in the cutouts of the bearing seats of two adjacent supporting members along the longitudinal direction.

7. The solar air conditioning device as claimed in claim 6, wherein the lower supporting member forms a pair of protrusions extending toward the upper supporting member and located at the cutouts, and the elongated plate of the connecting unit defines a pair of slots at a bottom thereof for receiving the protrusions of the lower supporting member therein.

8. The solar air conditioning device as claimed in claim 6, wherein the clapboard extends along the longitudinal direction of the elongated plate of the connecting unit and is located at a center of the elongated plate of the connecting unit.

9. A solar air conditioning device comprising:
  a solar collector assembly, comprising:

a heat-absorbing set comprising a plurality of heat-absorbing units, the heat-absorbing units engaging with each other, each of the heat-absorbing units comprising two adjacent supporting members and a heat-absorbing plate sandwiched between and buckled with the two adjacent supporting members; and a transparent panel assembled to a top of the heat-absorbing set, an air channel defined between the transparent panel and the heat-absorbing set, and a heat-absorbing channel defined below the air channel and hermetically isolated from the air channel;

an inlet assembly installed at an entrance of the solar collector assembly; and an outlet assembly installed at an exit of the solar collector assembly;

wherein the inlet and outlet assemblies communicate with opposite ends of the heat-absorbing channel, respectively, whereby air can flow from the inlet assembly to the outlet assembly via the heat-absorbing channel and vice versa;

wherein the heat-absorbing set further comprises a plurality of connecting units connecting adjacent two heat-absorbing units in a longitudinal direction; and wherein a pair of opposite cutouts are defined at front and rear ends of each of the supporting members, each of the connecting units comprising an elongated plate and an elongated clapboard perpendicularly extending from a top of the elongated plate, the clapboard sandwiched between two adjacent heat-absorbing plates along the longitudinal direction, the elongated plate being located at flanks of the clapboard and inserted in the cutouts of two adjacent supporting members along the longitudinal direction.

10. The solar air conditioning device as claimed in claim 9, wherein the lower supporting member forms a pair of protrusions extending toward the upper supporting member and located at the cutouts, and the elongated plate of the connecting unit defines a pair of slots at a bottom thereof, the slots receiving the protrusions of the lower supporting member therein.

11. The solar air conditioning device as claimed in claim 9, wherein the clapboard extends along the longitudinal direction of the elongated plate of the connecting unit and is located at a center of the elongated plate of the connecting unit.

12. The solar air conditioning device as claimed in claim 9, wherein each of the supporting members forms fasteners at two opposite lateral sides thereof, the heat-absorbing units being assembled by engagement between the fasteners of the supporting members and the heat-absorbing plate in a transverse direction.

13. The solar air conditioning device as claimed in claim 12, wherein each of the fasteners defines a space therein, the heat-absorbing plate forming a pair of protruding flanges extending substantially perpendicularly from two opposite lateral sides thereof, the protruding flanges being engaged in the spaces of the fasteners of two adjacent supporting members.

14. The solar air conditioning device as claimed in claim 13, wherein each of the supporting members comprises an upper supporting member located above the heat-absorbing plate and a lower supporting member located below the heat-absorbing plate, the two fasteners symmetrically formed from two opposite sides of the upper supporting member.

15. The solar air conditioning device as claimed in claim 14, wherein each of the fasteners comprises a horizontal plate and a vertical plate extending downwardly from the horizontal plate, and the space of each fastener of each of the supporting members is defined between the vertical plate and the lower supporting member.

16. A solar air conditioning device comprising:
a solar collector assembly, comprising:
a heat-absorbing set comprising a plurality of heat-absorbing units, the heat-absorbing units engaging with each other, each of the heat-absorbing units comprising two adjacent supporting members and a heat-absorbing plate sandwiched between and buckled with the two adjacent supporting members; and a transparent panel assembled to a top of the heat-absorbing set, an air channel defined between the transparent panel and the heat-absorbing set, and a heat-absorbing channel defined below the air channel and hermetically isolated from the air channel;

an inlet assembly installed at an entrance of the solar collector assembly; and an outlet assembly installed at an exit of the solar collector assembly;

wherein the inlet and outlet assemblies communicate with opposite ends of the heat-absorbing channel, respectively, whereby air can flow from the inlet assembly to the outlet assembly via the heat-absorbing channel and vice versa;

wherein each of the supporting members forms fasteners at two opposite lateral sides thereof, and the heat-absorbing units are assembled by engagement between the fasteners of the supporting members and the heat-absorbing plate in a transverse direction;

wherein the heat-absorbing set further comprises a plurality of connecting units connecting adjacent two heat-absorbing units in a longitudinal direction, and a length of each of the heat-absorbing plates is substantially equal to that of the supporting member;

wherein each of the supporting members comprises an upper supporting member located above the heat-absorbing plate and a lower supporting member located below the heat-absorbing plate, the two fasteners symmetrically formed from two opposite sides of the upper supporting member;

wherein each of the fasteners comprises a horizontal plate and a vertical plate extending downwardly from the horizontal plate in a manner such that a space is defined between the vertical plate and the lower supporting member; and wherein the heat-absorbing plate forms a pair of protruding flanges extending upwardly from two opposite lateral sides thereof, the protruding flanges engaged in the spaces of two adjacent supporting members.

* * * * *